United States Patent
Yu et al.

(10) Patent No.: US 10,346,701 B2
(45) Date of Patent: Jul. 9, 2019

(54) IMAGE RECOGNITION ACCELERATOR, TERMINAL DEVICE, AND IMAGE RECOGNITION METHOD

(71) Applicants: HUAWEI TECHNOLOGIES CO., LTD., Shenzhen, Guangdong (CN); NANYANG TECHNOLOGICAL UNIVERSITY, Singapore (SG)

(72) Inventors: Hao Yu, Singapore (SG); Yuhao Wang, Singapore (SG); Leibin Ni, Singapore (SG); Wei Yang, Hangzhou (CN); Junfeng Zhao, Shenzhen (CN); Shihai Xiao, Hangzhou (CN)

(73) Assignees: Huawei Technologies Co., Ltd., Shenzhen (CN); Nanyang Technological University, Singapore (SG)

(*) Notice: Subject to any disclaimer, the term of this patent is extended or adjusted under 35 U.S.C. 154(b) by 95 days.

(21) Appl. No.: 15/695,681

(22) Filed: Sep. 5, 2017

(65) Prior Publication Data
US 2018/0012095 A1   Jan. 11, 2018

Related U.S. Application Data

(63) Continuation of application No. PCT/CN2016/074240, filed on Feb. 22, 2016.

(30) Foreign Application Priority Data

Mar. 6, 2015 (CN) .......................... 2015 1 0101155

(51) Int. Cl.
*G06K 9/00* (2006.01)
*G06K 9/62* (2006.01)

(52) U.S. Cl.
CPC ........... *G06K 9/00973* (2013.01); *G06K 9/00* (2013.01); *G06K 9/6201* (2013.01)

(58) Field of Classification Search
CPC .... G06K 9/00973; G06K 9/00; G06K 9/6201; G06F 12/0246; G06F 2212/2022;
(Continued)

(56) References Cited

U.S. PATENT DOCUMENTS 3,440,617 A * 4/1969 Lesti .................... G06K 9/00
382/224
5,339,108 A * 8/1994 Coleman .............. H04N 9/8047
375/240.2

(Continued)

FOREIGN PATENT DOCUMENTS

CN   1577622 A   2/2005
CN   1904907 A   1/2007
(Continued)

OTHER PUBLICATIONS

Cho et al, "eDRAM-Based Tiered-Reliability Memory with Applications to Low-Power Frame Buffers", 2014, Proceedings of the 2014 international symposium on Low power electronics and design, pp. 333-338 (Year: 2014).*

(Continued)

*Primary Examiner* — David F Dunphy
(74) *Attorney, Agent, or Firm* — Leydig, Voit & Mayer, Ltd.

(57) ABSTRACT

An image recognition accelerator, a terminal device, and an image recognition method are provided. The image recognition accelerator includes a dimensionality-reduction processing module, an NVM, and an image matching module. The dimensionality-reduction processing module first reduces a dimensionality of first image data. The NVM writes, into a first storage area of the NVM according to a (Continued)

specified first current I, ω low-order bits of each numeric value of the first image data on which dimensionality reduction has been performed, and writes, into a second storage area of the NVM according to a specified second current, (N−ω) high-order bits of each numeric value of the first image data on which dimensionality reduction has been performed. The image matching module determines whether an image library stored in the NVM includes image data matching the first image data on which dimensionality reduction has been performed.

26 Claims, 11 Drawing Sheets

(58) Field of Classification Search
CPC ......... G06F 11/1068; G06F 2212/7206; G06F 3/0679; G06N 3/04
See application file for complete search history.

(56) References Cited

U.S. PATENT DOCUMENTS

| | | | | |
|---|---|---|---|---|
| 6,438,267 | B1* | 8/2002 | Kondo | H04N 19/50 |
| | | | | 375/E7.205 |
| 8,861,270 | B2 | 10/2014 | Strauss et al. | |
| 9,213,602 | B1* | 12/2015 | Alhussien | G06F 11/1068 |
| 2005/0013180 | A1 | 1/2005 | Koyama et al. | |
| 2008/0212683 | A1* | 9/2008 | Nakata | H04N 19/70 |
| | | | | 375/240.23 |
| 2010/0241927 | A1 | 9/2010 | Soma | |
| 2012/0140560 | A1* | 6/2012 | Yang | G06F 3/064 |
| | | | | 365/185.18 |
| 2013/0114852 | A1 | 5/2013 | Gu et al. | |
| 2013/0132644 | A1* | 5/2013 | Choi | G06F 12/0246 |
| | | | | 711/103 |
| 2014/0063025 | A1 | 3/2014 | Krig | |
| 2014/0226877 | A1 | 8/2014 | Je et al. | |
| 2014/0229131 | A1* | 8/2014 | Cohen | G11C 16/0483 |
| | | | | 702/64 |
| 2015/0180501 | A1* | 6/2015 | Courcy | H03M 1/66 |
| | | | | 341/144 |
| 2015/0205997 | A1 | 7/2015 | Ma et al. | |

FOREIGN PATENT DOCUMENTS

| | | |
|---|---|---|
| CN | 101236601 A | 8/2008 |
| CN | 103106388 A | 5/2013 |
| CN | 103514432 A | 1/2014 |
| CN | 103810119 A | 5/2014 |
| CN | 103824075 A | 5/2014 |
| JP | 2010218447 A | 9/2010 |
| JP | 2015508528 A | 3/2015 |

OTHER PUBLICATIONS

Bortolotti, Daniele, et al. "Approximate compressed sensing: ultra-low power biosignal processing via aggressive voltage scaling on a hybrid memory multi-core processor." ISLPED'14, Aug. 11-13, 2014, pp. 45-50.
Felipe Sampaio et al. Energy-Efficient Architecture for Advanced Video Memory, IEEE 2014. pp. 132-139.
Yuntan Fang et al. SoftPCM: Enhancing Energy Efficiency and Lifetime of Phase Change Memory in Video Applications via Approximate Write, IEEE 21st Asian Test Symposium, 2012. pp. 131-136.
Yuhao Wang et al. An Energy-efficient Non-volatile In-Memory Accelerator for Sparse-representation based Face Recognition, Design, Automation and Test in Europe Conference and Exhibition (Date) 2015. pp. 932-935.
Mahmut E. Sinangil et al. An SRAM Using Output Prediction to Reduce BL-Switching Activity and Statistically-Gated SA for up to 1.9× Reduction in Energy/Access, IEEE International Solid-State Circuits Conference, 2013. total 3 pages.
Ik Joon Chang et al. A Priority-Based 6T/8T Hybrid SRAM Architecture for Aggressive Voltage Scaling in Video Applications, IEEE Transactions on Circuits and Systems for Video Technology, vol. 21, No. 2, Feb. 2011. pp. 101-112.
Yitao Ma et al. An MTJ-Based Nonvolatile Associative Memory Architecture With Intelligent Power-Saving Scheme for High-Speed Low-Power Recognition Applications, IEEE 2013. pp. 1248-1251. XP32446152A.

* cited by examiner

| Dimensionality -reduction parameter γ | Width parameter ω | First current I | System power consumption E | Image recognition success rate QoS |
|---|---|---|---|---|
| γ1 | ω | I | E1 | QoS 1 |
| γ2 | ω | I | E2 | QoS 2 |
| γ | ω1 | I | E3 | QoS 3 |
| γ | ω | I2 | E4 | QoS 4 |
| γ3 | ω3 | I3 | E5 | QoS 5 |
| ... | ... | ... | ... | ... |

IMAGE RECOGNITION ACCELERATOR, TERMINAL DEVICE, AND IMAGE RECOGNITION METHOD

CROSS-REFERENCE TO RELATED APPLICATIONS

This application is a continuation of International Application No. PCT/CN2016/074240, filed on Feb. 22, 2016, which claims priority to Chinese Patent Application No. 201510101155.9, filed on Mar. 6, 2015. The disclosures of the aforementioned applications are hereby incorporated by reference in their entireties.

TECHNICAL FIELD

The present invention relates to the field of computer technologies, and in particular, to an image recognition accelerator, a terminal device, and an image recognition method.

BACKGROUND

Image recognition technologies are an important field of artificial intelligence. Image recognition refers to a technology that uses a computer to process and analyze an image, to recognize different targets and objects. In recent years, with the popularity of social networks, there are increasing demands for real-time image data analysis on a mobile device. However, because a relatively large quantity of system resources are consumed for implementation of image data analysis, a limited battery lifespan of a mobile device restricts application of image data analysis to mobile devices.

To reduce a system power consumption during a process of image data analysis, an image data processing method in the prior art reduces the system power consumption in a manner of lowering a write current that is used to write image data into a static random-access memory (SRAM). However, an error rate of data stored in the SRAM increases as the write current is lowered. To recover from an error, a manner such as convex optimization processing is further required to recover the stored image data, so that image recognition can be performed based on the recovered image data. In this manner, the system power consumption is reduced to some extent when data is written, but CPU computing complexity is high during a process of image recovery, which wastes a considerable quantity of system resources. In addition, to protect the data stored in the SRAM, the SRAM needs to stay in a power-on state. Therefore, the SRAM also has a static power consumption. In the foregoing image data processing manner, the static power consumption that is required for the SRAM to protect the data still cannot be eliminated. As a result, generally, when the existing image data processing manner is used to process image data, a system power consumption is still relatively high.

SUMMARY

Embodiments of the present invention provide an image recognition accelerator, a terminal device, and an image recognition method, which can ensure accuracy of image recognition while reducing a system power consumption of the terminal device.

According to a first aspect, an embodiment of the present invention provides an image recognition accelerator applied to a terminal device for image recognition, including: a dimensionality-reduction processing module, configured to reduce a dimensionality of first image data according to a specified dimensionality-reduction parameter $\gamma$, where the first image data on which dimensionality reduction has been performed includes multiple numeric values;

a non-volatile memory NVM, configured to: store, in a first storage area of the NVM according to a specified first current I, $\omega$ low-order bits of each numeric value of the first image data on which dimensionality reduction has been performed, and store, in a second storage area of the NVM according to a specified second current $I_s$, $(N-\omega)$ high-order bits of each numeric value of the first image data on which dimensionality reduction has been performed, where N is a quantity of bits occupied by each numeric value, $\omega$ is a specified width parameter, the first current I is lower than the second current $I_s$, and the dimensionality-reduction parameter $\gamma$, the width parameter $\omega$, and the first current I are obtained according to a system power consumption of the terminal device and a specified first image recognition success rate of the terminal device; and an image matching module, configured to determine whether an image library stored in the NVM includes image data matching the first image data on which dimensionality reduction has been performed.

With reference to the first aspect, in a first possible implementation manner of the first aspect, the image recognition accelerator further includes a parameter adjustment module, configured to: if an absolute value of a difference between a calculated image recognition success rate and a specified second image recognition success rate is greater than a preset threshold, adjust, according to the second image recognition success rate and the system power consumption of the terminal device, at least one of the following parameters: the dimensionality-reduction parameter, the width parameter, or the first current, to obtain an adjusted dimensionality-reduction parameter $\gamma'$, an adjusted width parameter $\omega'$, and an adjusted first current $I'$, where the second image recognition success rate is different from the first image recognition success rate;

the dimensionality-reduction processing module is further configured to reduce a dimensionality of second image data according to the adjusted dimensionality-reduction parameter $\gamma'$;

the non-volatile memory NVM is further configured to store, in the first storage area of the NVM according to the adjusted first current $I'$, $\omega'$ low-order bits of each numeric value of the second image data on which dimensionality reduction has been performed, and store, in the second storage area of the NVM according to the second current $I_s$, $(N-\omega')$ high-order bits of each numeric value of the second image data on which dimensionality reduction has been performed, where $I'$ is lower than $I_s$; and the image matching module is further configured to determine whether the image library stored in the NVM includes image data matching the second image data on which dimensionality reduction has been performed.

With reference to the first aspect or the first implementation manner of the first aspect, in a second possible implementation manner of the first aspect, the dimensionality-reduction processing module is specifically configured to:

obtain, according to a product of the first image data and a specified binary matrix, the first image data on which dimensionality reduction has been performed, where the first image data is a matrix with k rows and m columns, the binary matrix is a matrix with m rows and n columns, and the first image data on which dimensionality reduction has been performed is a matrix with k rows and n columns, where k, m, and n are positive integers, a value of m is greater than a value of n, the value of n is determined according to the dimensionality-reduction parameter γ, and γ=n/m.

With reference to the first or the second possible implementation manner of the first aspect, in a third possible implementation manner of the first aspect, the parameter adjustment module is specifically configured to:

if an absolute value of the difference between the calculated image recognition success rate and the second image recognition success rate is greater than the preset threshold, separately adjust a value of the dimensionality-reduction parameter, the width parameter, or the first current to reduce the system power consumption E, and separately obtain an adjusted image recognition success rate, where a value of E is proportional to a value of $\gamma((N-\omega)*I_s^2+\omega*I)$;

determine a lowest power consumption E' of the terminal device, obtainable when the absolute value of the difference between the adjusted image recognition success rate and the second image recognition success rate is not greater than the preset threshold; and select values of the dimensionality-reduction parameter, the width parameter, and the first current that make a highest image recognition success rate while satisfying the lowest power consumption E', as the adjusted dimensionality-reduction parameter γ', the adjusted width parameter ω', and the adjusted first current I', respectively.

According to a second aspect, an embodiment of the present invention provides a terminal device, where the terminal device includes a central processing unit (CPU) and an image recognition accelerator; the CPU is configured to send to-be-recognized first image data to the image recognition accelerator; and the image recognition accelerator is configured to: reduce a dimensionality of the first image data according to a specified dimensionality-reduction parameter γ, where the first image data on which dimensionality reduction has been performed includes multiple numeric values;

store, in a first storage area of an NVM according to a specified first current I, ω low-order bits of each numeric value of the first image data on which dimensionality reduction has been performed, and store, in a second storage area of the NVM according to a specified second current $I_s$, (N−ω) high-order bits of each numeric value of the first image data on which dimensionality reduction has been performed, where N is a quantity of bits occupied by each numeric value, ω is a specified width parameter, I is lower than $I_s$, and the dimensionality-reduction parameter γ, the width parameter ω, and the first current I are obtained according to a system power consumption of the terminal device and a specified first image recognition success rate of the terminal device; and determine whether an image library stored in the NVM includes image data matching the first image data on which dimensionality reduction has been performed.

With reference to the second aspect, in a first possible implementation manner of the second aspect, the image recognition accelerator is further configured to: if an absolute value of a difference between a calculated image recognition success rate and a specified second image recognition success rate is greater than a preset threshold, adjust, according to the second image recognition success rate and the system power consumption of the terminal device, a value of at least one of the following parameters: the dimensionality-reduction parameter, the width parameter, or the first current, to obtain an adjusted dimensionality-reduction parameter γ', an adjusted width parameter ω', and an adjusted first current I', where the second image recognition success rate is different from the first image recognition success rate;

the CPU is further configured to send second image data to the image recognition accelerator; and the image recognition accelerator is further configured to: reduce a dimensionality of the second image data according to the adjusted dimensionality-reduction parameter γ';

store, in the first storage area of the NVM according to the adjusted first current I', ω low-order bits of each numeric value of the second image data on which dimensionality reduction has been performed, and store, in the second storage area of the NVM according to the second current $I_s$, (N−ω') high-order bits of each numeric value of the second image data on which dimensionality reduction has been performed, where I' is lower than $I_s$; and determine whether the image library stored in the NVM includes image data matching the second image data on which dimensionality reduction has been performed.

With reference to the second aspect, in a second possible implementation manner of the second aspect, the CPU is further configured to: collect statistics on matching results that are output by the image recognition accelerator within a preset statistic collection period, to obtain a calculated image recognition success rate; and determine that an absolute value of a difference between the calculated image recognition success rate and a specified second image recognition success rate is greater than a preset threshold;

the image recognition accelerator is further configured to adjust, according to the second image recognition success rate and the system power consumption of the terminal device, at least one of the following parameters: the dimensionality-reduction parameter, the width parameter, or the first current, to obtain an adjusted dimensionality-reduction parameter γ', an adjusted width parameter ω', and an adjusted first current I', where the second image recognition success rate is different from the first image recognition success rate;

the CPU is further configured to send second image data to the image recognition accelerator; and the image recognition accelerator is further configured to: reduce a dimensionality of the second image data according to the adjusted dimensionality-reduction parameter γ';

store, in the first storage area of the NVM according to the adjusted first current I', ω' low-order bits of each numeric value of the second image data on which dimensionality reduction has been performed, and store, in the second storage area of the NVM according to the second current $I_s$, (N−ω') high-order bits of each numeric value of the second image data on which dimensionality reduction has been performed, where I' is lower than $I_s$; and determine whether the image library stored in the NVM includes image data matching the second image data on which dimensionality reduction has been performed.

With reference to the second aspect, in a third possible implementation manner of the second aspect, the CPU is further configured to:

collect statistics on matching results that are output by the image recognition accelerator within a preset statistic collection period, to obtain a calculated image recognition success rate;

if an absolute value of a difference between the calculated image recognition success rate and a specified second image recognition success rate is greater than a preset threshold, adjust, according to the second image recognition success rate and the system power consumption of the terminal device, a value of the at least one of the following parameters: the dimensionality-reduction parameter, the width parameter, or the first current, to obtain an adjusted dimensionality-reduction parameter γ', an adjusted width parameter ω', or an adjusted first current I', where the second image recognition success rate is different from the first image recognition success rate; and send second image data to the image recognition accelerator; and the image recognition accelerator is further configured to:

reduce a dimensionality of the second image data according to the adjusted dimensionality-reduction parameter γ';

store, in the first storage area of the NVM according to the adjusted first current I', ω' low-order bits of each numeric value of the second image data on which dimensionality reduction has been performed, and store, in the second storage area of the NVM according to the second current $I_s$, (N−ω) high-order bits of each numeric value of the second image data on which dimensionality reduction has been performed, where I' is lower than $I_s$; and determine whether the image library stored in the NVM includes image data matching the second image data on which dimensionality reduction has been performed.

With reference to any one of the second aspect or the first to the third possible implementation manners of the second aspect, in a fourth possible implementation manner of the second aspect, the image recognition accelerator is specifically configured to:

obtain, according to a product of the first image data and a specified binary matrix, the first image data on which dimensionality reduction has been performed, where the first image data is a matrix with k rows and m columns, the binary matrix is a matrix with m rows and n columns, and the first image data on which dimensionality reduction has been performed is a matrix with k rows and n columns, where k, m, and n are positive integers, a value of m is greater than a value of n, the value of n is determined according to the specified dimensionality-reduction parameter γ, and γ=n/m.

With reference to the first or the second possible implementation manner of the second aspect, in a fifth possible implementation manner of the second aspect, the image recognition accelerator is specifically configured to:

separately adjust a value of the dimensionality-reduction parameter, the width parameter, or the first current to reduce the system power consumption E of the terminal device, and separately obtain an adjusted image recognition success rate, where a value of E is proportional to a value of $\gamma((N-\omega)*I_s^2+\omega*I)$;

determine a lowest power consumption E' of the terminal device, obtainable when an absolute value of a difference between the adjusted image recognition success rate and the second image recognition success rate is not greater than the preset threshold; and select values of the dimensionality-reduction parameter, the width parameter, and the first current that make a highest image recognition success rate while satisfying the lowest power consumption E', as the adjusted dimensionality-reduction parameter γ', the adjusted width parameter ω', and the adjusted first current I', respectively.

With reference to the third possible implementation manner of the second aspect, in a sixth possible implementation manner of the second aspect, the CPU is specifically configured to:

separately adjust a value of the dimensionality-reduction parameter, the width parameter, or the first current to reduce the system power consumption E of the terminal device, and separately obtain an adjusted image recognition success rate, where a value of E is proportional to a value of $\gamma((N-\omega)*I_s^2+\omega*I)$;

determine a lowest power consumption E' of the terminal device, obtainable when the absolute value of the difference between the adjusted image recognition success rate and the second image recognition success rate is not greater than the preset threshold; and select values of the dimensionality-reduction parameter, the width parameter, and the first current that make a highest image recognition success rate while satisfying the lowest power consumption E', as the adjusted dimensionality-reduction parameter γ', the adjusted width parameter ω', and the adjusted first current I', respectively.

According to a third aspect, an embodiment of the present invention provides an image recognition method applied to a terminal device, where the method is executed by an image recognition accelerator in the terminal device, and the method includes:

reducing a dimensionality of first image data according to a specified dimensionality-reduction parameter γ, where the first image data on which dimensionality reduction has been performed includes multiple numeric values;

storing, in a first storage area of a non-volatile memory NVM in the image recognition accelerator according to a specified first current I, ω low-order bits of each numeric value of the first image data on which dimensionality reduction has been performed, and storing, in a second storage area of the NVM according to a specified second current $I_s$, (N−ω) high-order bits of each numeric value of the first image data on which dimensionality reduction has been performed, where N is a quantity of bits occupied by each numeric value, ω is a specified width parameter, I is lower than $I_s$, and the dimensionality-reduction parameter γ, the width parameter ω, and the first current I are obtained according to a system power consumption of the terminal device and a specified first image recognition success rate of the terminal device; and determining whether an image library stored in the NVM includes image data matching the first image data on which dimensionality reduction has been performed.

With reference to the third aspect, in a first possible implementation manner of the third aspect, the method further includes:

determining that an absolute value of a difference between a calculated image recognition success rate and a specified second image recognition success rate is greater than a preset threshold;

adjusting, according to the second image recognition success rate and the system power consumption of the terminal device, a value of at least one of the following parameters: the dimensionality-reduction parameter, the width parameter, or the first current, to obtain an adjusted dimensionality-reduction parameter γ', an adjusted width parameter ω', and an adjusted first current I', where the second image recognition success rate is different from the first image recognition success rate;

reducing a dimensionality of second image data according to an adjusted dimensionality-reduction parameter γ';

storing, in the first storage area of the NVM according to an adjusted first current I', ω' low-order bits of each numeric value of the second image data on which dimensionality reduction has been performed, and storing, in the second storage area of the NVM according to the second current $I_s$, (N−ω') high-order bits of each numeric value of the second image data on which dimensionality reduction has been performed, where I' is lower than $I_s$; and determining whether the image library stored in the NVM includes image data matching the second image data on which dimensionality reduction has been performed.

With reference to the third aspect or the first possible implementation manner of the third aspect, in a second possible implementation manner of the third aspect, the reducing a dimensionality of first image data according to a specified dimensionality-reduction parameter γ includes:

obtaining, according to a product of the first image data and a specified binary matrix, the first image data on which dimensionality reduction has been performed, where the first image data is a matrix with k rows and m columns, the binary matrix is a matrix with m rows and n columns, and the first image data on which dimensionality reduction has been performed is a matrix with k rows and n columns, where k, m, and n are positive integers, a value of m is greater than a value of n, the value of n is determined according to the specified dimensionality-reduction parameter γ, and γ=n/m.

With reference to any one of the third aspect or the first or the second possible implementation manners of the third aspect, in a third possible implementation manner of the third aspect, the adjusting, according to the second image recognition success rate and the system power consumption of the terminal device, at least one of the following parameters: the dimensionality-reduction parameter, the width parameter, or the first current includes:

separately adjusting a value of the dimensionality-reduction parameter, the width parameter, or the first current to reduce the system power consumption E of the terminal device, and separately obtaining an adjusted image recognition success rate, where a value of E is proportional to a value of $\gamma((N-\omega)*I_s^2+\omega*I)$;

determining a lowest power consumption E' of the terminal device, obtainable when the absolute value of the difference between the adjusted image recognition success rate and the second image recognition success rate is not greater than the preset threshold; and selecting values of the dimensionality-reduction parameter, the width parameter, and the first current that make a highest image recognition success rate while satisfying the lowest power consumption E', as the adjusted dimensionality-reduction parameter γ', the adjusted width parameter ω', and the adjusted first current I', respectively.

According to a fourth aspect, an embodiment of the present invention provides a computer program product, including a computer readable storage medium that stores program code, where an instruction included in the program code is used to execute the method in the foregoing third aspect.

According to a fifth aspect, an embodiment of the present invention provides another image recognition accelerator applied to a terminal device for image recognition. The image recognition accelerator includes a dimensionality-reduction processing module, a non-volatile memory NVM, and an image matching module. The dimensionality-reduction processing module is configured to: receive a dimensionality-reduction parameter γ, and reduce a dimensionality of first image data according to the received dimensionality-reduction parameter γ, where the first image data on which dimensionality reduction has been performed includes multiple numeric values, and the dimensionality-reduction parameter γ is obtained according to a system power consumption of the terminal device and a specified first image recognition success rate of the terminal device. The non-volatile memory NVM is configured to: receive a width parameter ω and a first current I, obtain a storage bit quantity S according to the received width parameter ω, store, in a first storage area of the NVM according to the specified first current I, S low-order bits of each numeric value of the first image data on which dimensionality reduction has been performed, and store, in a second storage area of the NVM according to a specified second current $I_s$, (N−S) high-order bits of each numeric value of the first image data on which dimensionality reduction has been performed, where N is a quantity of bits occupied by each numeric value, the first current I is lower than the second current $I_s$, and the width parameter ω and the first current I are obtained according to the system power consumption of the terminal device and the specified first image recognition success rate of the terminal device. The image matching module is configured to determine whether an image library stored in the NVM includes image data matching the first image data on which dimensionality reduction has been performed.

With reference to the fifth aspect, in a possible implementation manner, the image recognition accelerator further includes a parameter adjustment module. The parameter adjustment module is configured to: adjust, according to the specified first image recognition success rate and the system power consumption of the terminal device, a value of at least one of the following parameters: the dimensionality-reduction parameter, the width parameter, or the first current, to obtain the dimensionality-reduction parameter γ, the width parameter ω, or the first current I; send the dimensionality-reduction parameter γ to the dimensionality-reduction processing module; and send the width parameter ω and the first current I to the NVM.

With reference to the fifth aspect or the possible implementation manner, in another possible implementation manner, the parameter adjustment module is specifically configured to: separately adjust the value of the dimensionality-reduction parameter, the width parameter, or the first current, and separately obtain multiple adjusted image recognition success rates and multiple adjusted system power consumptions, where each adjusted image recognition success rate is corresponding to one adjusted system power consumption; determine a difference between each adjusted image recognition success rate and the first image recognition success rate, and select a lowest system power consumption from at least one adjusted system power consumption corresponding to at least one adjusted image recognition success rate, where an absolute value of a difference between the at least one adjusted image recognition success rate and the first image recognition success rate is not greater than a preset threshold; select values of the dimensionality-reduction parameter, the width parameter, and the first current that make a highest image recognition success rate while satisfying the lowest system power consumption, as the dimensionality-reduction parameter γ, the width parameter ω, and the first current I, respectively; send the dimensionality-reduction parameter γ to the dimensionality-reduction processing module; and send the width parameter ω and the first current I to the NVM.

With reference to the fifth aspect or the possible implementation manners, in another possible implementation manner, the dimensionality-reduction processing module is specifically configured to obtain, according to a product of the first image data and a specified binary matrix, the first image data on which dimensionality reduction has been performed, where the first image data is a matrix with k rows and m columns, the binary matrix is a matrix with m rows and n columns, and the first image data on which dimensionality reduction has been performed is a matrix with k rows and n columns, where k, m, and n are positive integers, a value of m is greater than a value of n, the value of n is determined according to the specified dimensionality-reduction parameter γ, and γ=n/m.

According to the embodiments of the present invention, an image recognition accelerator applied to a terminal device for image recognition includes a dimensionality-reduction processing module, an NVM, and an image matching module. During a process of recognizing first image data by the image recognition accelerator, the dimensionality-reduction processing module first reduces a dimensionality of the first image data according to a specified dimensionality-reduction parameter γ. The NVM may write, into a first storage area of the NVM according to a specified first current I, ω low-order bits of each numeric value of the first image data on which dimensionality reduction has been performed, and write, into a second storage area of the NVM according to a specified second current $I_s$, (N−ω) high-order bits of each numeric value of the first image data on which dimensionality reduction has been performed. The first current is lower than the second current. In this way, the image matching module may determine whether an image library stored in the NVM includes image data matching the first image data on which dimensionality reduction has been performed, so as to obtain an image recognition result for the first image data. The specified dimensionality-reduction parameter γ, the width parameter ω, and the first current I are all obtained according to a system power consumption of the terminal device and a specified first image recognition success rate of the terminal device; therefore, it can be ensured that an error that occurs in a storing process of low-order bits of a numeric value that are to be stored in the first storage area has relatively little impact on a recognition success rate for the first image data. The image recognition accelerator according to the embodiments of the present invention can ensure accuracy of image recognition while reducing the system power consumption of the terminal device, and can increase a speed of recognizing image data.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention.

DESCRIPTION OF EMBODIMENTS

To make a person skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention.

Figure 1:
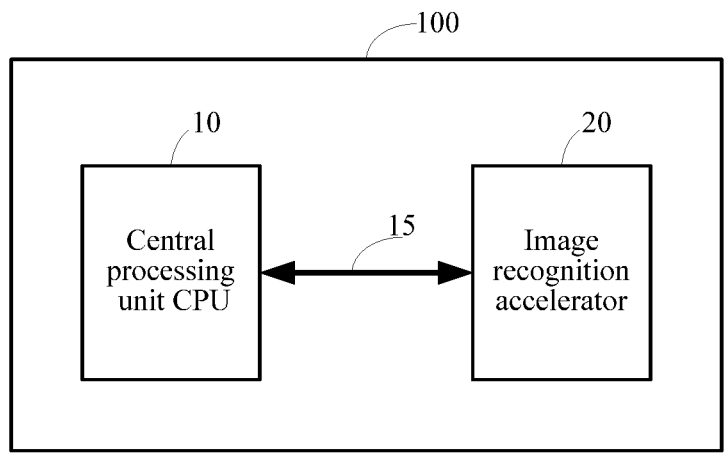
FIG. 1 is a schematic structural diagram of a terminal device according to an embodiment of the present invention.

An embodiment of the present invention provides an image recognition accelerator, which can ensure accuracy of image recognition while reducing a system power consumption. FIG. 1 is a schematic structural diagram of a terminal device according to an embodiment of the present invention. In the terminal device 100 shown in FIG. 1, a central processing unit (CPU) 10 exchanges data directly with an image recognition accelerator 20 by using a bus 15. The bus 15 may be a system bus such as a PCI, a PCIE, or an accelerated graphics port AGP bus, and a type of the bus 15 is not limited in this embodiment of the present invention. It should be noted that, the terminal device 100 shown in FIG. 1 may be a terminal device such as a computer, a mobile phone, or a mobile terminal, which is not limited herein provided that the terminal device is a terminal device requiring implementation of image recognition.

As shown in FIG. 1, the CPU 10 is a computing core and a control core (or Control Unit) of the terminal device 100. The CPU 10 may be a very large scale integrated circuit. An operating system and another software program are installed on the CPU 10, which enable the CPU 10 to access storage space such as a memory and a cache. It may be understood that the CPU 10 is merely an example of a processor in this embodiment of the present invention. In addition to the CPU 10, the processor may alternatively be another application-specific integrated circuit (ASIC), or one or more integrated circuits configured to implement this embodiment of the present invention.

The image recognition accelerator 20 is one type of hardware accelerator. In this embodiment of the present invention, the image recognition accelerator 20 is a hardware accelerator based on a non-volatile memory (NVM). A hardware acceleration technology uses a hardware module to substitute for a software algorithm, so as to fully utilize an inherent high-speed feature of hardware to increase a processing speed of a computer system. In a conventional image data processing method, a memory is used only to store image data, while all processing and analysis of the image data is completed by a CPU; therefore, a processing speed of the CPU and transmission bandwidth of the memory have become bottlenecks for development of an image recognition technology. In this embodiment of the present invention, a simple logic processing circuit is added to the memory, so that a dedicated image recognition accelerator is used to implement image data processing. In the terminal device 100 shown in FIG. 1, the CPU 10 only needs to send to-be-recognized image data to the image recognition accelerator 20 and receive a recognition result obtained by the image recognition accelerator 20. In this way, load of the CPU 10 is reduced, and an image recognition speed of the terminal device is increased. In addition, in a system structure shown in FIG. 1, a data volume transmitted between the CPU 10 and the image recognition accelerator 20 is reduced; therefore, a problem that an image recognition speed is limited by transmission bandwidth of the memory can be resolved.

Figure 2:
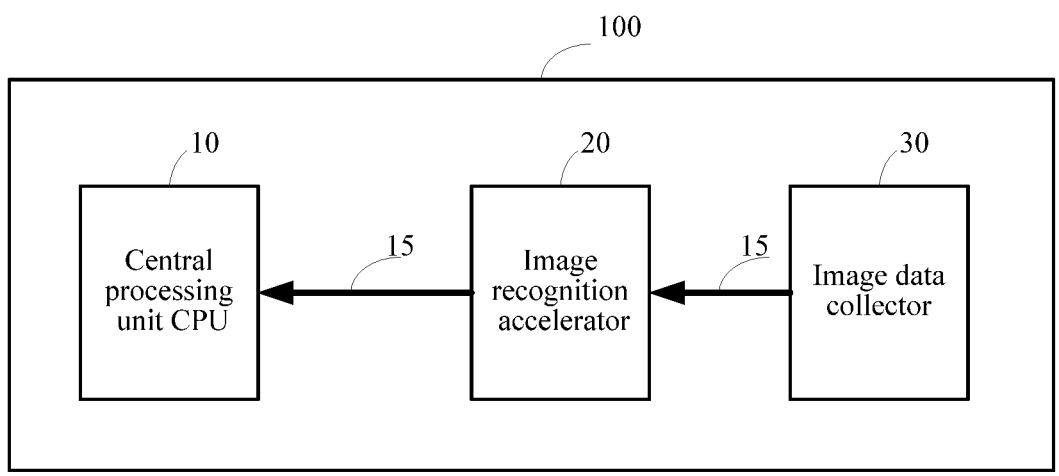
FIG. 2 is a schematic structural diagram of another terminal device according to an embodiment of the present invention.

In an actual application, the image recognition accelerator 20 exchanges data not only with the CPU 10. FIG. 2 is a schematic structural diagram of another terminal device according to an embodiment of the present invention. The terminal device 100 shown in FIG. 2 may include a CPU 10, an image recognition accelerator 20, and an image data collector 30. The CPU 10 and the image data collector 30 are both connected to the image recognition accelerator 20. The image data collector 30 is configured to: collect image data information, and send the collected image data information to the image recognition accelerator 20 for image recognition. A person skilled in the art may know that the image data collector 30 may collect images of people or objects, and no specific limitation is imposed on image information herein. After collecting image information, the image data collector 30 may convert the collected image information into image data. In an actual application, the image data collector 30 may include a component that has a photo shooting or video shooting function. For example, the image data collector may be a camera on a mobile phone. The image recognition accelerator 20 is configured to: recognize the image data information sent by the image data collector 30 and stored image data information, and send a recognition result to the CPU 10. It may be understood that, for functions and implementation manners of the CPU 10 and the image recognition accelerator 20 that are shown in FIG. 2, reference may be made to the descriptions in the FIG. 1. Details are not described herein again.

It may be understood that, the foregoing merely describes two schematic structures of the terminal device 100 provided in the embodiments of the present invention, and two application scenarios of the image recognition accelerator 20. In another scenario, alternatively, the image recognition accelerator 20 may receive image data information sent by the CPU 10 and perform image recognition, and then send an image recognition result to another component or device. In still another scenario, alternatively, the image recognition accelerator 20 may receive image data information sent by another component (for example, the image data collector 30 in FIG. 2), and feed back an image recognition result to the component. A component that communicates with the image recognition accelerator 20 is not limited herein. The following describes in detail a specific structure and an operation process of the image recognition accelerator 20 provided in the embodiments of the present invention.

Figure 3:
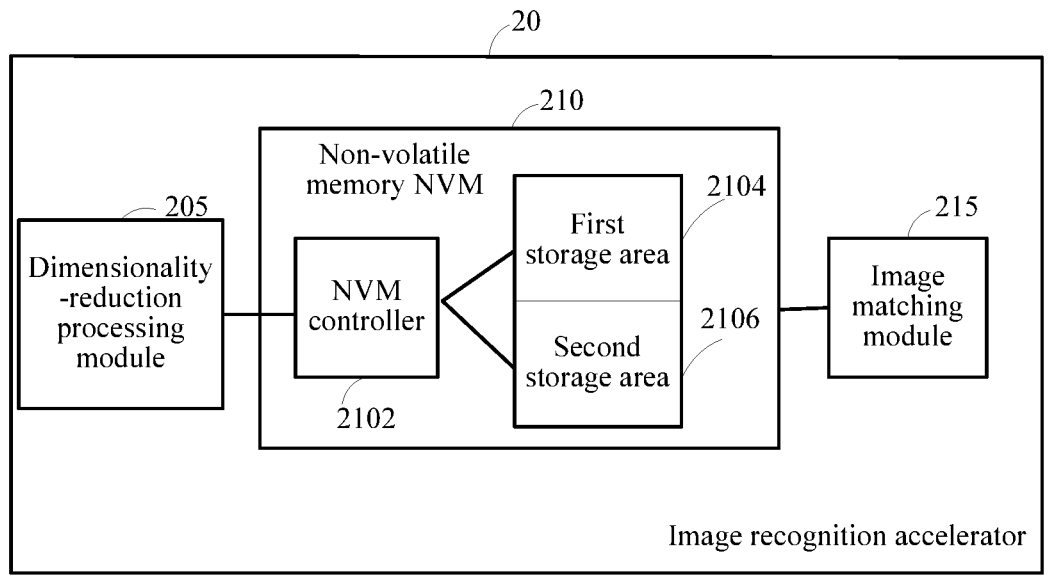
FIG. 3 is a schematic structural diagram of an image recognition accelerator according to an embodiment of the present invention.

FIG. 3 is a schematic structural diagram of an image recognition accelerator 20 according to an embodiment of the present invention. FIG. 3 provides a relatively detailed illustration for a structure of the image recognition accelerator 20. As shown in FIG. 3, in this embodiment of the present invention, the image recognition accelerator 20 may include a dimensionality-reduction processing module 205, a non-volatile memory NVM 210, and an image matching module 215. It should be noted that, both the dimensionality-reduction processing module 205 and the image matching module 215 may be in a form of a logic circuit, or may be in a form of an integrated circuit. In an actual application, the image recognition accelerator 20 may be an application-specific integrated circuit (ASIC) or a board. In this embodiment of the present invention, a specific form of the image recognition accelerator 20 is not limited. To clearly describe operating principles of components in the image recognition accelerator 20, the following describes, in detail with reference to a flowchart of an image recognition method shown in FIG. 4, structures and operating processes of the components in the image recognition accelerator 20 shown in FIG. 3. In the following embodiment, an example in which the image recognition accelerator 20 processes first image data is used for description.

Figure 4:
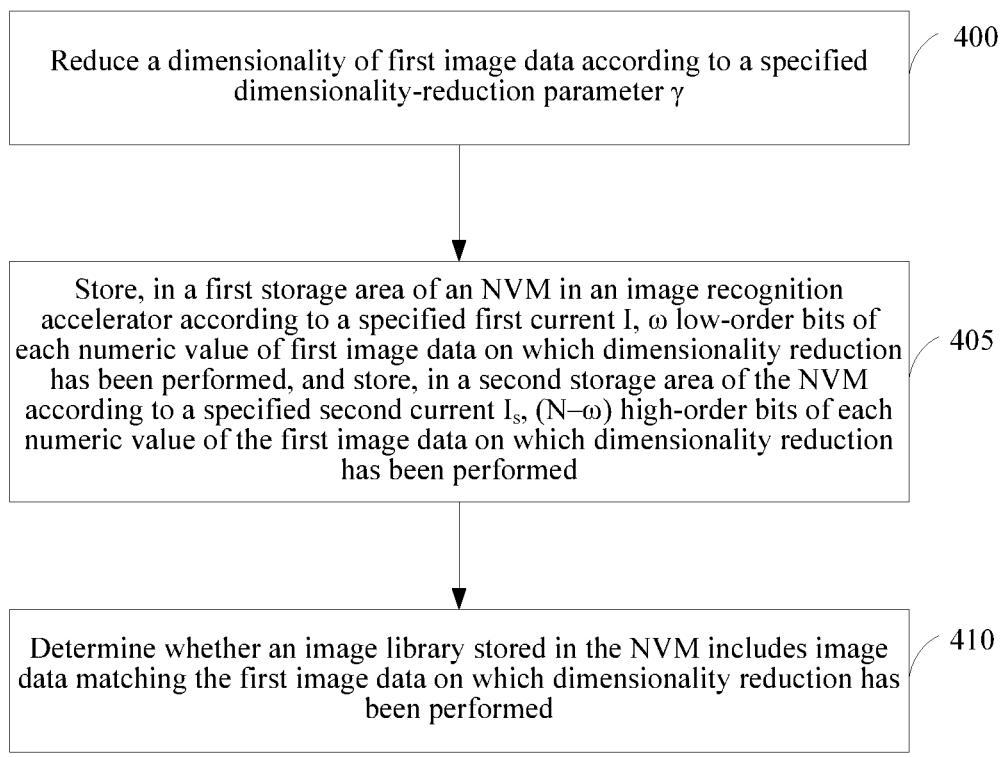
FIG. 4 is a flowchart of an image recognition method according to an embodiment of the present invention.

The dimensionality-reduction processing module 205 is configured to reduce a dimensionality of image data according to a specified dimensionality-reduction parameter $\gamma$. Specifically, as shown in FIG. 4, in step 400, the dimensionality-reduction processing module 205 may reduce a dimensionality of the first image data according to the specified dimensionality-reduction parameter $\gamma$. A person skilled in the art may know that image data is a set of grayscale values, represented by numeric values, of pixels. Generally, image data is a discrete array that is obtained by sequentially extracting information about each pixel of an image, and the discrete array may represent a continuous image. For example, the first image data may be represented as a matrix with k rows and m columns, and each numeric value in the matrix is used to represent a grayscale value of a pixel of a first image data. In other words, the first image data is a set of grayscale values, represented by numeric values, of pixels of the first image. To increase an image recognition speed, in this embodiment of the present invention, the dimensionality-reduction processing module 205 may use a sparse-representation-based random mapping manner to reduce the dimensionality of the first image data. No limitation is imposed on a compression algorithm implemented by the dimensionality-reduction processing module 205 in this embodiment of the present invention provided that a sparse-representation-based random mapping algorithm can be implemented.

In an actual application, the dimensionality-reduction processing module 205 may be implemented by using a matrix multiplier. Specifically, the dimensionality-reduction processing module 205 may use the matrix multiplier to multiply the first image data and a specified low-dimensional binary matrix, so as to achieve a purpose of reducing the dimensionality of the first image data. The binary matrix refers to a matrix in which all numeric values are represented by 0 or 1. A purpose of using a binary matrix to implement dimensionality reduction is to reduce computing complexity during a dimensionality reduction process. In this embodiment of the present invention, the specified low-dimensional binary matrix may be a Bernoulli matrix. However, a specific form of the binary matrix is not limited in this embodiment of the present invention provided that the binary matrix can achieve the purpose of dimensionality reduction in a sparse-representation manner. For example, the first image data is a matrix X with k rows and m columns, the specified binary matrix is a Bernoulli matrix Z with m rows and n columns, where k, m, and n are all positive integers, and m is greater than n. The matrix multiplier may multiply the first image data and the specified Bernoulli matrix Z, to obtain a matrix Y with k rows and n columns, and the matrix Y is the first image data on which dimensionality reduction has been performed. In other words, reducing a dimensionality of the matrix X is actually for a purpose of reducing a quantity of columns of the matrix X. In an actual application, a value of n may be determined according to a value of m and the specified dimensionality-reduction parameter γ, where the dimensionality-reduction parameter γ is a ratio of a dimensionality of the first image data on which dimensionality reduction has been performed to the dimensionality of the first image data, that is, γ=n/m, and n=m*γ. The dimensionality-reduction parameter γ may also be referred to as a dimensionality-reduction ratio.

A person skilled in the art may know that, a multiplier is an electronic component used to implement a function of multiplying two analog signals or two digital signals that are unrelated to each other. The multiplier may multiply two binary numbers. The matrix multiplier is a component composed of multiple multipliers and adders and used to multiply matrices. In the matrix multiplier, computation of different columns of multipliers or adders is unrelated, and parallel computing can be implemented. Therefore, a dimensionality of a matrix can be adjusted by increasing or reducing a column quantity of multipliers and adders in the matrix multiplier. For ease of description, in this embodiment of the present invention, a circuit composed of a multiplier and an adder and used to perform a multiplication operation on matrices is also referred to as a multiplier-accumulator.

Figure 5:
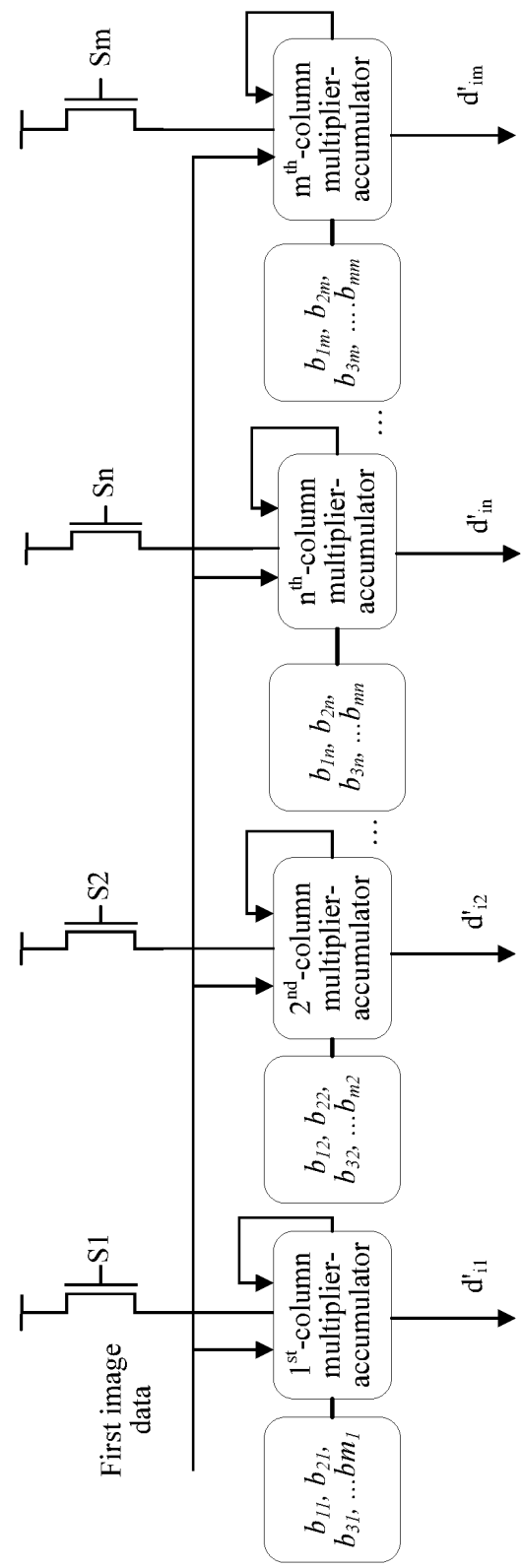
FIG. 5 is a schematic structural diagram of a dimensionality-reduction processing module according to an embodiment of the present invention.

In this embodiment of the present invention, the dimensionality-reduction processing module 205 may disable some columns of multiplier-accumulators in the matrix multiplier, to achieve the purpose of reducing a dimensionality of image data. Specifically, power sources of some columns of multiplier-accumulators in the dimensionality-reduction processing module 205 may be turned off, so as to disable these columns of multiplier-accumulators. FIG. 5 is a schematic structural diagram of a dimensionality-reduction processing module 205 according to an embodiment of the present invention. As shown in FIG. 5, the dimensionality-reduction processing module 205 includes m columns of multiplier-accumulators. Operations of these columns of multiplier-accumulators are mutually independent. For each column of multiplier-accumulator, an independent switch is used to control whether this column of multiplier-accumulator works. For example, a switch S1 is configured to control a $1^{st}$-column multiplier-accumulator, and a switch S2 is configured to control a $2^{nd}$-column multiplier-accumulator. By analogy, a switch Sm is configured to control an $m^{th}$-column multiplier-accumulator. A person skilled in the art may know that a switch may be implemented by using a field effect transistor or a switch circuit. For example, a switch may be a junction field effect transistor (JFET) or a metal-oxide semiconductor field-effect transistor (MOSFET). An implementation manner of a switch is not limited herein.

For example, in this embodiment of the present invention, the dimensionality-reduction processing module 205 may receive the first image data X sent by a CPU 10 or an image data collector 30, where X is a matrix with k rows and m columns. It is assumed that the specified Bernoulli matrix Z is a matrix with m rows and n columns. Then, m columns of multiplier-accumulators may be configured in the dimensionality-reduction processing module 205. In one cycle, a numeric value in the first image data may be transmitted to all the m columns of multiplier-accumulators in the matrix multiplier. Each column of multiplier-accumulator in the matrix multiplier may perform a multiplication operation on the received numeric value and one numeric value of one row of numeric values in the Bernoulli matrix Z stored in the dimensionality-reduction processing module 205, and output a computation result. In other words, in one cycle, each column of multiplier-accumulator may output a computation result on one numeric value in the matrix X and one numeric value in the matrix Z. That is, in one cycle, the m columns of multiplier-accumulators may obtain a computation result on the numeric value in the matrix X and one row of numeric values in the matrix Z. It may be understood that, according to this manner, after m*k cycles, a computation result on k rows of numeric values in the matrix X and the Bernoulli matrix Z may be obtained. During a process of reducing the dimensionality of the first image data, to implement a dimensionality-reduction operation on the first image data, the dimensionality-reduction processing module 205 may obtain the value of n according to the specified dimensionality-reduction parameter γ and the value of m in the first image data, and turn off, according to the obtained value of n, switches in the matrix multiplier that control multiplier-accumulators for (m−n) columns. For example, as shown in FIG. 5, switches in the matrix multiplier that control the $(n+1)^{th}$ column to the $m^{th}$ column of multiplier-accumulators may be turned off, so that the $(n+1)^{th}$ column to the $m^{th}$ column of multiplier-accumulators in the matrix multiplier do not perform computation during a computing process. According to the foregoing manner, the dimensionality-reduction processing module 205 can perform a multiplication operation on the matrix X and the matrix Z, to obtain the first image data on which dimensionality reduction has been performed, where the first image data on which dimensionality reduction has been performed is represented by the matrix Y with k rows and n columns.

A non-volatile memory (NVM) 210 is configured to store to-be-recognized image data and image data preset in an image library. Specifically, as shown in FIG. 4, in step 405, the NVM 210 may store, in a first storage area 2104 of the NVM 210 in the image recognition accelerator 20 according to a specified first current I, ω low-order bits of each numeric value of the first image data on which dimensionality reduction has been performed, and store, in a second storage area 2106 of the NVM 210 according to a specified second current $I_s$, (N−ω) high-order bits of each numeric value of the first image data on which dimensionality reduction has been performed. The dimensionality-reduction parameter γ, a width parameter ω, and the first current I are obtained according to a system power consumption of a terminal device and a specified first image recognition success rate of the terminal device.

In this embodiment of the present invention, the NVM 210 is a new-generation non-volatile memory. An access speed of the NVM 210 is equivalent to an access speed of a conventional volatile memory (for example, a dynamic random access memory (DRAM) or a static random access memory (SRAM)). In addition, the NVM 210 has reliability of a semiconductor product and a relatively long service life, and can implement addressing by byte and write data in units of bits into a storage medium. Therefore, the NVM 210 can be mounted on a memory bus, to be used as a memory for direct access by the CPU 10. It should be noted that, different from a conventional volatile memory, the NVM 210 is non-volatile. After a power source of a terminal device 100 is turned off, information in the NVM 210 still exists. In this embodiment of the present invention, the NVM 210 may include a next-generation NVM representative of a phase change memory (PCM), a resistive random access memory (RRAM), a magnetic random access memory (MRAM), a ferroelectric random access memory (FRAM), or the like. Specifically, a spin-transfer torque magnetic random access memory (STT-MRAM) has a relatively long service life and a relatively low power consumption, and a write success rate of the STT-MRAM has a relatively close relationship with a write current. Therefore, in this embodiment of the present invention, the NVM 210 may be an STT-MRAM.

The NVM 210 may include an NVM controller 2102, the first storage area 2104, and the second storage area 2106. The NVM controller 2102 is configured to access the first storage area 2104 and the second storage area 2106. For example, the NVM controller 2102 may write data into the first storage area 2104 and the second storage area 2106, or read data from the first storage area 2104 and the second storage area 2106. In an actual application, the NVM controller 2102 may include a processor, an application-specific integrated circuit (ASIC), or one or more integrated circuits configured to implement this embodiment of the present invention. The NVM controller 2102 may further include a cache, a communications interface, and the like. A specific structure of the NVM controller 2102 is not limited herein.

The first storage area 2104 and the second storage area 2106 may be storage areas composed of multiple storage units. In this embodiment of the present invention, a storage unit refers to a smallest storage medium unit for storing data, and each storage unit is configured to store one bit of data. For example, a storage unit may include a non-volatile storage unit such as a phase storage unit, a magnetic storage unit, a resistive storage unit, or the like. In this embodiment of the present invention, that the NVM 210 is an STT-MRAM is used as an example. The first storage area 2104 and the second storage area 2106 may be storage arrays composed of multiple magnetic storage units. A person skilled in the art may know that each magnetic storage unit includes two magnetic layers and one tunnel layer. An electromagnetic direction of one magnetic layer is fixed, and an electromagnetic direction of the other magnetic layer may be changed by using an external electromagnetic field. When the directions of the two magnetic layers are consistent, the magnetic storage unit has a low resistance, which is used to represent data "0"; when the directions of the two magnetic layers are opposite, the magnetic storage unit has a high resistance, which is used to represent data "1". Generally, a person skilled in the art refers to a magnetic layer whose electromagnetic direction can be changed by using an external electromagnetic field, as a free layer. In this embodiment of the present invention, a magnetic direction of a free layer can be changed by a spin polarization current flowing through a magnetic storage unit. It should be noted that, in this embodiment of the present invention, the first storage area 2104 and the second storage area 2106 are not necessarily consecutive address spaces. Moreover, in addition to the first storage area 2104 and the second storage area 2106, the NVM 210 may also include storage space (not shown in the figure) used to store other data, which is not limited herein.

A person skilled in the art may know that, compared with a conventional memory, a non-volatile memory basically does not have a static power consumption but higher energy overheads (which may also be referred to as a dynamic power consumption) is caused by read and write operations on the non-volatile memory. The static power consumption refers to energy overheads caused during a period in which no read operation or write operation is performed on the non-volatile memory. A purpose of reducing the system power consumption of the terminal device can be achieved by reducing the dynamic power consumption of the NVM. Specifically, the dynamic power consumption of the NVM can be controlled by controlling a magnitude of a write current during a write process. However, a person skilled in the art may know that, during a process of writing data into a magnetic storage unit, an intensity of a write current needs to exceed a threshold current, so as to ensure switching between resistance states of the magnetic storage unit. Therefore, the write success rate is also closely related to the magnitude of the write current. During an implementation process of the present invention, it is found that, for some image and video applications and the like, an error that occurs on low-order bits of data during a storing process has relatively little impact on a recognition success rate. In this embodiment of the present invention, to reduce a write power consumption without affecting an image data recognition success rate, the NVM 210 stores image data in a storage manner combining different write currents. According to this manner, the NVM controller 2102 may write, by controlling write currents, low-order bits and high-order bits of each numeric value of the first image data on which dimensionality reduction processing has been performed by the dimensionality-reduction processing module 205, into the first storage area 2104 and the second storage area 2106, respectively. Specifically, in this embodiment of the present invention, a write current I of the first storage area 2104 is lower than a write current $I_s$ of the second storage area 2106. For example, the write current of the first storage area 2104 may be the first current I, and the write current $I_s$ of the second storage area 2106 may be 2I. A person skilled in the art may know that the NVM controller 2102 may control a magnitude of a write current by controlling a write voltage.

Figure 6:
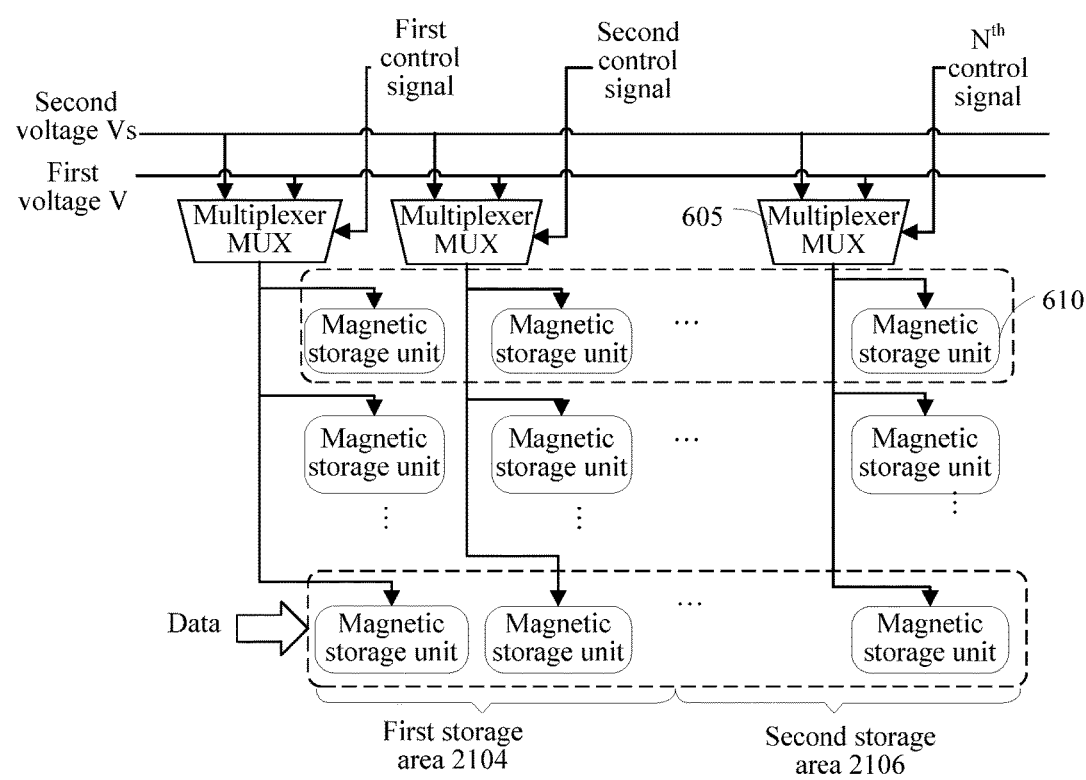
FIG. 6 is a schematic hardware structure diagram of an NVM according to an embodiment of the present invention.

FIG. 6 is a schematic diagram of a hardware structure of an NVM 210 according to an embodiment of the present invention. As shown in FIG. 6, the first storage area 2104 and the second storage area 2106 are storage arrays composed of multiple magnetic storage units 610. The NVM controller 2102 may control the first current I by controlling a first voltage V, and the NVM controller 2102 may control the second current $I_s$ by controlling a second voltage Vs. Magnetic storage units 610 of a same column may be connected to one multiplexer (MUX) 605. The NVM controller 2102 may use a control signal to control whether the multiplexer 605 is to output the first voltage V or output the second Vs, so as to achieve a purpose of selecting to write, into the first storage area 2104 according to the first current I, the ω low-order bits of each numeric value of the first image data on which dimensionality reduction has been performed, or write, into the second storage area 2106 according to the second current $I_s$, the (N−ω) high-order bits of each numeric value. N is a quantity of bits occupied by each numeric value, and ω is the specified width parameter. For example, if a numeric value of to-be-recognized image data is 64 bits, 16 low-order bits of the numeric value may be written into the first storage area 2104 according to the first current I, and 48 high-order bits of the numeric value may be written into the second storage area 2106 according to the second current $I_s$. For ease of description, in this embodiment of the present invention, ω is referred to as the width parameter. In an actual application, both a value of ω and a value of the first current I need to be determined according to the system power consumption of the terminal device 100 and the specified image recognition success rate of the terminal device 100. It may be understood that, for different types of to-be-recognized image data, different image recognition success rates are required, and values of the specified width parameter ω and the first current I are also different, where the value of ω is a positive integer.

It may be understood that, FIG. 6 provides a schematic illustration for merely a part of the structure of the NVM 210 for a purpose of expound how the NVM 210 in the image recognition accelerator 20 stores image data into different areas. In an actual application, the multiplexer MUX 605 may not be connected to the magnetic storage units 610 directly, but instead, the MUX 605 writes data into the magnetic storage units 610 by using a write apparatus (not shown in FIG. 6) in the STT-MRAM. Herein, in an actual application, alternatively, a MUX 605 may be configured for multiple columns of magnetic storage units 610, or a MUX 605 may further be configured for one or more rows of magnetic storage units 610. A quantity of MUXs 605 and a connection relationship between a MUX 605 and a magnetic storage unit 610 are not limited herein provided that different portions of a numeric value of the image data can be respectively written into different magnetic storage units 610 according to different currents.

An image matching module 215 is configured to determine whether the image library stored in the NVM includes image data matching the first image data on which dimensionality reduction has been performed, and output a matching result. Specifically, with reference to FIG. 4, in step 410, the image matching module 215 may determine whether the image library stored in the NVM 210 includes image data matching the first image data on which dimensionality reduction has been performed, so as to obtain the matching result of the first image data on which dimensionality reduction has been performed and the image data in the image library stored in the NVM 210. For example, the image matching module 215 may read, respectively from the first storage area 2104 and the second storage area 2106, the first image data obtained after dimensionality, and directly perform matching between the first image data on which dimensionality reduction has been performed and the image data in the image library stored in the NVM 210, to determine whether the first image data can be recognized successfully. It may be understood that, for image recognition, the NVM 210 needs to store the image library that includes at least one piece of image data in advance. In this embodiment of the present invention, the image matching module 215 may be a logic circuit or an ASIC chip. For example, the image matching module 215 may perform, according to a matching pursuit (MP) algorithm and by using a logic circuit or an ASIC chip, computation on the first image data on which dimensionality reduction has been performed and the image data in the image library, to determine whether the image library stored in the NVM includes image data matching the first image data on which dimensionality reduction has been performed, thereby obtaining the matching result. It may be understood that, the image data in the image library may alternatively be image data that is stored in the NVM 210 and that has undergone the same processing as the first image data.

It should be noted that, a specific implementation form of the image matching module 215 is not limited in this embodiment of the present invention provided that an image data matching process can be implemented. In addition, a specific matching algorithm is not limited in this embodiment of the present invention either. In an actual application, an orthogonal matching pursuit (OMP) algorithm may be used, or another matching algorithm may be used. No limitation is imposed herein on a matching algorithm used by the image matching module 215. In an actual application, after obtaining the matching result, the image matching module 215 may return the matching result to a CPU or send the matching result to another data processing module. No limitation is imposed herein.

In this embodiment of the present invention, the NVM 210 writes, according to different currents, different portions of each numeric value of the first image data on which dimensionality reduction has been performed, into the first storage area 2104 and the second storage area 2106, respectively, and the first current I is lower than the second current $I_s$. Therefore, a system power consumption introduced when data is stored in the first storage area 2104 according to the first current I is lower than that introduced when data is stored in the second storage area 2106 according to the second current $I_s$. A person skilled in the art may know that, generally, a lower write current indicates a higher possibility that an error occurs on stored data. Alternatively, in other words, an image data recognition success rate decreases as a write current drops. Therefore, in the prior art, generally, stored data is recovered in a recovery manner such as convex optimization before image recognition is performed. In this embodiment of the present invention, the specified width parameter ω and the first current I are obtained according to the system power consumption of the terminal device 100 and the specified first image recognition success rate of the terminal device 100, so that an error that occurs in a storing process of low-order bits of a numeric value that are to be stored in the first storage area 2104 has relatively little impact on the recognition success rate. Therefore, during a process of implementing image data matching by the image matching module 215, image data does not need to be recovered before the matching, but instead, matching may be performed directly between the first image data on which dimensionality reduction has been performed and stored in the NVM 210 and the image data in the image library. This image recognition manner provided in this embodiment of the present invention can ensure the specified image recognition success rate while reducing the system power consumption, so as to ensure accuracy of stored image data.

Figure 7:
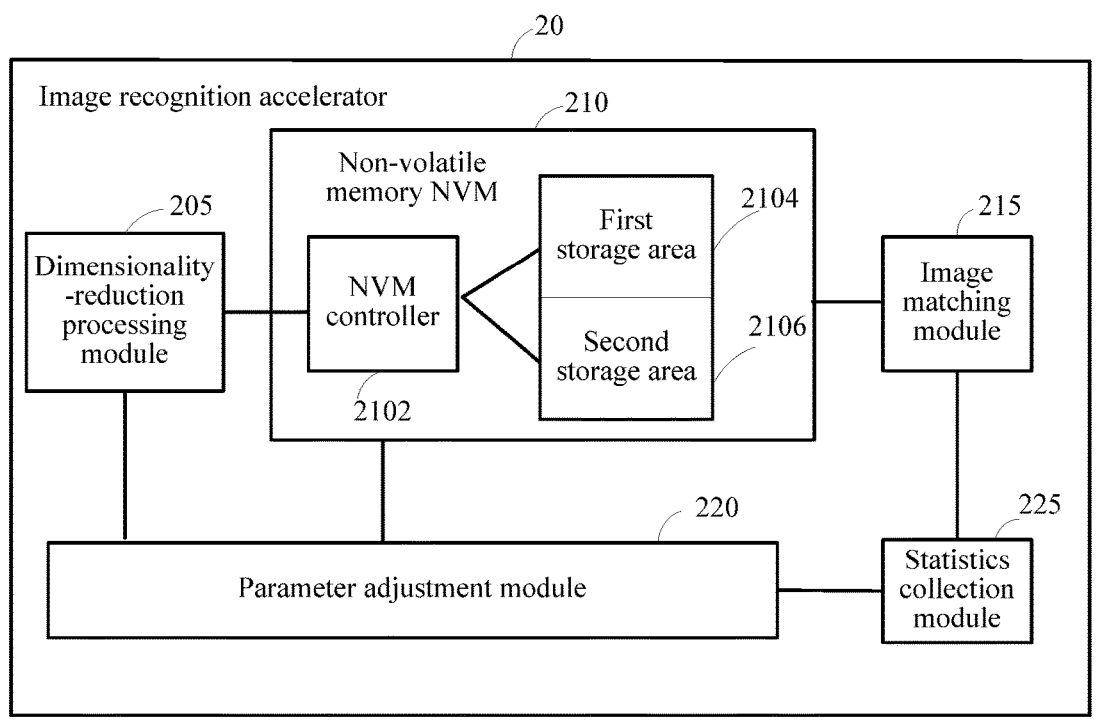
FIG. 7 is a schematic structural diagram of another image recognition accelerator according to an embodiment of the present invention.

To enable the terminal device 100 to meet recognition requirements of different types of image data and ensure the specified image recognition success rate while reducing the system power consumption, a statistics collection module 225 and a parameter adjustment module 220 may further be configured in the image recognition accelerator 20 provided in the embodiments of the present invention. As shown in FIG. 7, FIG. 7 is a schematic structural diagram of another image recognition accelerator 20 according to an embodiment of the present invention. As shown in FIG. 7, based on the structure shown in FIG. 3, the parameter adjustment module 220 is connected to both the dimensionality-reduction processing module 205 and the NVM 210. The statistics collection module 225 is connected to both the image matching module 215 and the parameter adjustment module 220. The following describes, in detail with reference to another image recognition method shown in FIG. 8, structures and operating principles of the components in the image recognition accelerator 20 shown in FIG. 7.

Figure 8:
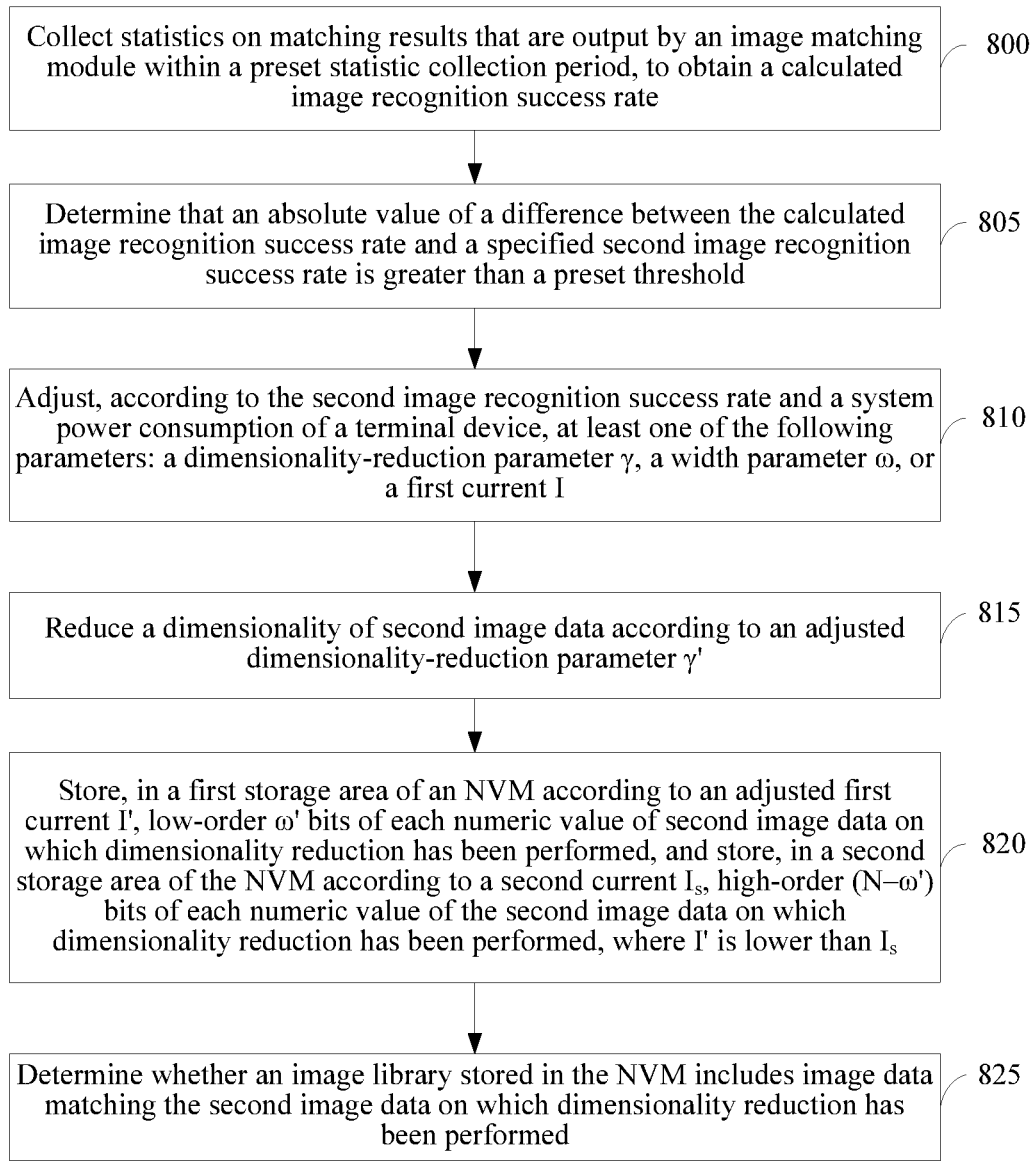
FIG. 8 is a flowchart of another image recognition method according to an embodiment of the present invention.

The statistics collection module 225 is configured to collect statistics on matching results that are output by the image matching module 215 within a preset statistic collection period, to obtain a calculated image recognition success rate. In this case, the parameter adjustment module 220 can determine, according to the image recognition success rate calculated by the statistics collection module 225 and a specified second image recognition success rate, whether an image recognition parameter needs to be adjusted. Specifically, as shown in FIG. 8, in step 800, the statistics collection module 225 may collect statistics on the matching results that are output by the image matching module 215 within the preset statistic collection period, to obtain the calculated image recognition success rate. It may be understood that, the image recognition success rate obtained by the statistics collection module 225 is obtained according to recognition results for multiple pieces of image data. In an actual application, the statistics collection module 225 may be a component such as a counter. A specific implementation form of the statistics collection module 225 is not limited herein.

It may be understood that, FIG. 7 illustrates merely a structure of the statistics collection module 225. In an actual application, the statistics collection module 225 may alternatively be configured independently in the terminal device 100, or the statistics collection module 225 may be configured in the CPU 10, or the statistics collection module 225 is configured in another device connected to the image matching module 215. A specific location in which the statistics collection module 225 is configured is not limited in this embodiment of the present invention.

The parameter adjustment module 220 is configured to: if an absolute value of a difference between the calculated image recognition success rate and the specified second image recognition success rate is greater than a preset threshold, adjust, according to the second image recognition success rate and the system power consumption of the terminal device, at least one of the following parameters: a dimensionality-reduction parameter γ, a width parameter ω, or a first current I. For ease of description, in this embodiment of the present invention, the dimensionality-reduction parameter γ, the width parameter ω, and the first current I may be referred to as image recognition parameters collectively. Specifically, the parameter adjustment module 220 may determine, according to the absolute value of the difference between the image recognition success rate calculated by the statistics collection module 225 and the specified second image recognition success rate, whether a value of an image recognition parameter needs to be adjusted. The second image recognition success rate is a newly specified image recognition success rate, and the second image recognition success rate is different from the foregoing first image recognition success rate. It may be understood that, the second image recognition success rate may be obtained from the CPU 10 in advance. With reference to FIG. 8, in step 805, if the parameter adjustment module 220 determines that the absolute value of the difference between the calculated image recognition success rate and the specified second image recognition success rate is greater than the preset threshold, the parameter adjustment module 220 may adjust, in step 810 according to the second image recognition success rate and the system power consumption of the terminal device, at least one of the following parameters: the dimensionality-reduction parameter γ, the width parameter ω, or the first current I.

Figures 9, 10A:
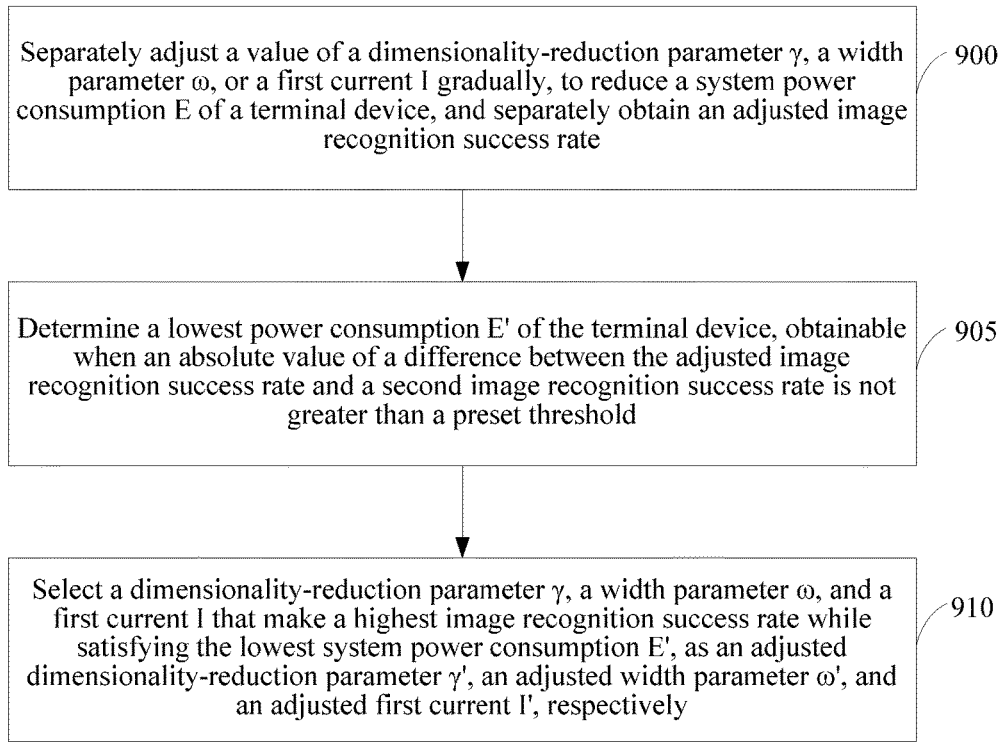
FIG. 9 is a flowchart of a parameter adjustment method according to an embodiment of the present invention.
FIG. 10(A) and FIG. 10(B) are schematic diagrams of parameters recorded during a parameter adjustment process according to an embodiment of the present invention.

To clearly describe how the parameter adjustment module 220 specifically adjusts the image recognition parameter, the following describes, with reference to a flowchart of a parameter adjustment method shown in FIG. 9, how the parameter adjustment module 220 balances the system power consumption and the image recognition success rate to obtain a proper image recognition parameter. FIG. 9 is a flowchart of a parameter adjustment method according to an embodiment of the present invention. In this embodiment of the present invention, an example in which an image recognition success rate needs to be adjusted from the first image recognition success rate to the second image recognition success rate is used for description. As shown in FIG. 9, the parameter adjustment method may include the following steps.

Figure 10B:
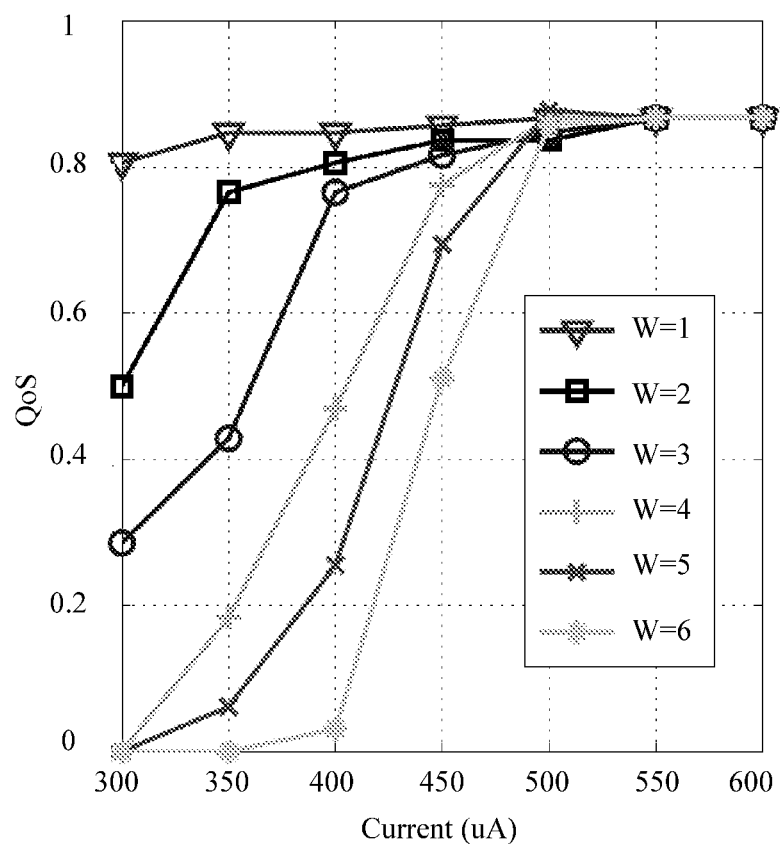

In step 900, the parameter adjustment module 220 separately adjusts a value of the dimensionality-reduction parameter γ, the width parameter ω, or the first current I gradually, to reduce the system power consumption E of the terminal device, and obtains adjusted image recognition success rates by using the statistics collection module 225. It can be learnt from the foregoing that, a smaller value of the first current I indicates a lower dynamic power consumption introduced when the terminal device 100 stores image data, and consequently a lower system power consumption of the terminal device 100. As the value of the width parameter ω increases, data stored in the first storage area 2104 according to the first current I increases, and therefore, the system power consumption of the terminal device 100 is lower. A smaller value of the dimensionality-reduction parameter γ indicates a smaller data volume of the image data on which dimensionality reduction has been performed and further a lower system power consumption of the terminal device 100. A value of the system power consumption E of the terminal device is proportional to a value of $\gamma((N-\omega)*I_s^2+\omega*I)$, where $I_s$ is a specified standard write current, or may be referred to as a guard current. When data is written into the NVM 210 according to $I_s$, accuracy of the image data can be ensured. Generally, a value of $I_s$ may be obtained according to a physical parameter of the NVM 210; during a process of using the NVM 210, $I_s$ of the NVM 210 does not change. It may be understood that, NVMs 210 manufactured with different techniques have different physical parameters, and therefore, $I_s$ may also vary. The second image data is a set of grayscale values, represented by numeric values, of pixels of a second image, where the second image data may include multiple numeric values. In an actual application, during a process of adjusting an image recognition parameter, the parameter adjustment module 220 may reduce the system power consumption E of the terminal device 100 in a manner of gradually increasing the value of the width parameter ω, or gradually reducing the dimensionality-reduction parameter γ, or gradually reducing the value of the first current I. The parameter adjustment module 220 may record values of the parameters, system power consumptions, and obtained image recognition success rates during the adjustment process. A record form may be a tabular form shown in FIG. 10(A), or may be a graphic form shown in FIG. 10(B), or may be another record form. FIG. 10(B) merely illustrates a graphic form used to record how the adjustment of ω and I changes a value of the image recognition success rate. It may be learnt that, recording in a graphic form is more intuitive than that in a tabular form. In this embodiment of the present invention, the image recognition success rate may also be referred to as quality of service QoS. It may be understood that, the image recognition success rate may be obtained from an experiment in which definite image recognition parameters are used for recognition of multiple pieces of image data. The system power consumption may be obtained by means of computation according to a formula $\gamma((N-\omega)*I_s^2+\omega*I)$. It may be understood that, the value of the system power consumption may be an estimated value.

Specifically, during the parameter adjustment process, after the value of the dimensionality-reduction parameter γ, the width parameter ω, or the first current I is adjusted once, multiple pieces of experimental data may be recognized by using the image recognition accelerator shown in FIG. 3, so as to obtain a recognition success rate at which the multiple pieces of experimental data are recognized according to the adjusted value of the dimensionality-reduction parameter γ, the width parameter ω, or the first current I, and obtain, by means of calculation according to $\gamma((N-\omega)*I_s^2+\omega*I)$, a system power consumption resulting from each parameter adjustment, and finally obtain multiple groups of parameter values and values of corresponding system power consumptions and image recognition success rates that are shown in FIG. 10(A). It may be understood that, in this embodiment of the present invention, the experimental data is also image data. For example, during the adjustment process, the adjusted parameters are γ3, ω3, and I3 in FIG. 10(A). After the parameter adjustment module 220 adjusts the value of the dimensionality-reduction parameter, the width parameter, or the first current to a first group of parameter values: γ3, ω3, and I3, the parameter adjustment module 220 may obtain, by means of calculation according to the formula $\gamma((N-\omega)*I_s^2+\omega*I)$, a system power consumption E5 corresponding to the first group of parameter values. In addition, the parameter adjustment module 220 may send the adjusted parameter value γ3 to the dimensionality-reduction processing module 205, and send ω3 and I3 to the NVM 210. The dimensionality-reduction processing module 205, the NVM 210, and the image matching module 215 jointly recognize the experimental data according to the adjusted parameter values γ3, ω3, and I3 by using the method shown in FIG. 4, so as to obtain the corresponding system power consumption and a corresponding image recognition success rate. Specifically, the dimensionality-reduction processing module 205 performs dimensionality-reduction processing on the experimental data according to the received dimensionality-reduction parameter value γ3. The NVM 210 stores, in the first storage area 2104 according to I3, ω3 low-order bits of experimental data on which dimensionality reduction has been performed, and stores, in the second storage area 2106 according to $I_s$, (N−ω3) high-order bits of the experimental data on which dimensionality reduction has been performed. The image matching module 215 may read the experimental data on which dimensionality reduction has been performed, from the first storage area 2104 and the second storage area 2106 respectively, and directly perform matching between the experimental data on which dimensionality reduction has been performed and the image data in the image library stored in the NVM 210, to determine whether the experimental data can be successfully recognized. In this manner, after the multiple pieces of experimental data are recognized according to γ3, ω3, and I3, the image recognition success rate QoS 5 corresponding to the group of parameter values may be obtained. If QoS 5 does not meet a requirement of the second image recognition success rate, the value of the dimensionality-reduction parameter γ, the width parameter ω, or the first current I may continue to be adjusted, and then the experimental data is recognized according to an adjusted parameter value by using the method shown in FIG. 4. In this way, during the parameter adjustment process, an image recognition success rate and a system power consumption resulting from each parameter value adjustment can be obtained in this manner. For example, the multiple groups of parameter values and the corresponding system power consumptions and image recognition success rates, shown in FIG. 10(A), may be obtained in this manner.

In an actual application, the value of the width parameter ω is a positive integer. Therefore, during the adjustment process, for ease of adjustment, the value of the width parameter ω may be adjusted first, and then a value of at least one of γ or I is adjusted based on an adjusted value of the width parameter ω, so that after the experimental data is recognized according to the adjusted parameter values, a requirement of a specified image recognition success rate (for example, the second image recognition success rate) can be met. In this embodiment of the present invention, a specific sequence of adjusting the parameter values is not limited. It may be understood that, during the parameter adjustment process, after a parameter value is adjusted, the adjusted parameter value may be used for recognizing a preset quantity of experimental data, so as to obtain an image recognition success rate. In this embodiment of the present invention, a recognition success rate at which the multiple pieces of experimental data are recognized during the parameter adjustment process may be referred to as an adjusted recognition success rate. It may be understood that, in this embodiment of the present invention, an experimental library may be preset, where the experimental library stores image data for experiment purposes, which is used as the experimental data during the parameter adjustment process. It should be noted that, in this embodiment of the present invention, ω, γ, I, E, and QoS in a header part of a table shown in FIG. 10(A) (the first row in FIG. 10(A)) are used to represent parameters, while ω, γ, I, γ1, ω1, I2, E1, QoS 1, and so on, in other parts of the table than the first row are all used to represent specific parameter values. In this embodiment of the present invention, ω, γ, I, γ', ω', and I' in the other parts are all used to represent specific parameter values. In other words, in this embodiment of the present invention, unless otherwise specified, both ω and ω' are used to represent values of the width parameter, both γ and γ' are used to represent values of the dimensionality-reduction parameter, and both I and I' are used to represent values of the first current.

In step 905, the parameter adjustment module 220 determines a lowest power consumption E' of the terminal device, obtainable when an absolute value of a difference between the adjusted image recognition success rate and the specified second image recognition success rate is not greater than the preset threshold. It may be understood that, during the parameter adjustment process shown in step 900, multiple image recognition success rates and multiple system power consumptions, corresponding to the adjusted parameters, may be obtained. A person skilled in the art may understand that, a smaller value of the dimensionality-reduction parameter γ indicates a smaller data volume of the image data on which dimensionality reduction has been performed and a lower error possibility. However, a larger amount of information is included in each numeric value of the image data on which dimensionality reduction has been performed. Therefore, in an actual application, there may be a case in which the dimensionality-reduction parameter γ reduces while the image recognition success rate is higher. In this case, a compromise between the dimensionality-reduction parameter γ and the image recognition success rate needs to be considered.

In this embodiment of the present invention, all image recognition success rates, absolute values of whose differences from the specified second image recognition success rate are not greater than the preset threshold, are used as image recognition success rates that meet the requirement of the second image recognition success rate. For example, if the second image recognition success rate is 90% and the preset threshold is 2%, all image recognition success rates from 88% to 92% may be considered as image recognition success rates that meet the requirement of the second image recognition success rate. In this step, at least one image recognition success rate that meets the requirement of the second image recognition success rate may be determined from the recorded multiple image recognition success rates, and the lowest system power consumption E' may be determined from at least one system power consumption corresponding to the at least one image recognition success rate.

In step 910, the parameter adjustment module 220 selects values of the dimensionality-reduction parameter, the width parameter, and the first current that make a highest image recognition success rate while satisfying the lowest system power consumption E', as the adjusted dimensionality-reduction parameter γ', the adjusted width parameter ω', and the adjusted first current I', respectively. It may be understood that, there may be multiple image recognition success rates that meet the requirement of the second image recognition success rate and that are corresponding to the lowest system power consumption E' determined in step 905. Therefore, in step 910, the parameter adjustment module 220 may select values of the dimensionality-reduction parameter, the width parameter, and the first current that make the highest image recognition success rate while satisfying the lowest system power consumption E', as the adjusted dimensionality-reduction parameter γ', the adjusted width parameter ω', and the adjusted first current I'. For example, in a first case, the width parameter ω increases by 1 bit, an obtained image recognition success rate is 88%, and the system power consumption E' is 10 W. In a second case, the dimensionality-reduction parameter γ decreases by 0.5, an obtained image recognition success rate is 90%, and the system power consumption E' is also 10 W. In a third case, the current I decreases by 500 µA, an obtained image recognition success rate is 92%, and the system power consumption E' is also 10 W. Therefore, values of the dimensionality-reduction parameter, the width parameter, and the first current in the third case may be used as the adjusted dimensionality-reduction parameter γ', the adjusted width parameter ω', and the adjusted first current I'.

It may be understood that, in this embodiment of the present invention, merely a simple example is provided for the process of adjusting the image recognition parameters by the parameter adjustment module 220. In an actual application, the foregoing three parameters may further be adjusted in a combined manner. For example, the width parameter ω may increase by 1 bit, and the dimensionality-reduction parameter γ may decrease by 0.5 at the same time. A specific adjustment form is not limited in this embodiment of the present invention provided that at least one parameter of the foregoing three image recognition parameters is adjusted. In an actual application, the parameter adjustment module 220 may determine the adjusted dimensionality-reduction parameter γ', the adjusted width parameter ω', and the adjusted first current I' according to a greedy algorithm.

Figure 11:
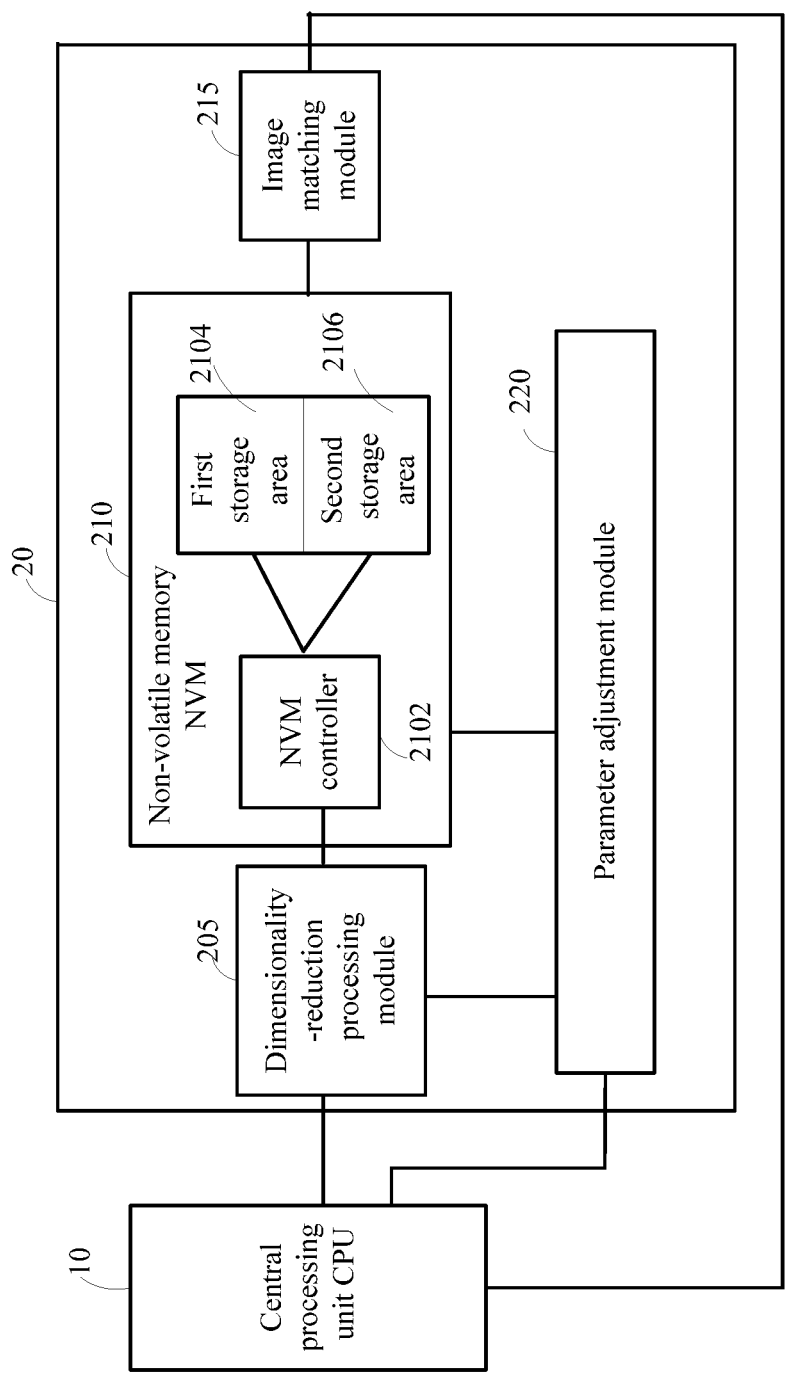
FIG. 11 is a schematic structural diagram of still another terminal device according to an embodiment of the present invention.

It should be noted that, in an actual application, the statistics collection module 225 may alternatively be located in the CPU 10 of the terminal device 100. In this case, the parameter adjustment module 220 may adjust the image recognition parameter according to an instruction of the CPU 10. As shown in FIG. 11, FIG. 11 is a schematic structural diagram of still another terminal device according to an embodiment of the present invention. In a structure shown in FIG. 11, the statistics collection module 225 (not shown in FIG. 11) may be located in the CPU 10, and the CPU 10 may calculate, according to matching results sent by the image matching module 215 within a preset statistic collection period, an image recognition success rate of the image recognition accelerator 20. If an absolute value of a difference between the calculated image recognition success rate and the second image recognition success rate is greater than the preset threshold, the CPU 10 may send a parameter adjustment instruction to the parameter adjustment module 220, to instruct the parameter adjustment module 220 to adjust the image recognition parameter. The parameter adjustment instruction includes the second image recognition success rate. In other words, in the structure shown in FIG. 11, the CPU 10 and the parameter adjustment module 220 jointly implement a function of adjusting the image recognition parameter. Specifically, the CPU 10 may execute actions in steps 800 to 805 shown in FIG. 8, and instruct the parameter adjustment module 220 to execute an action in step 810.

Figure 12:
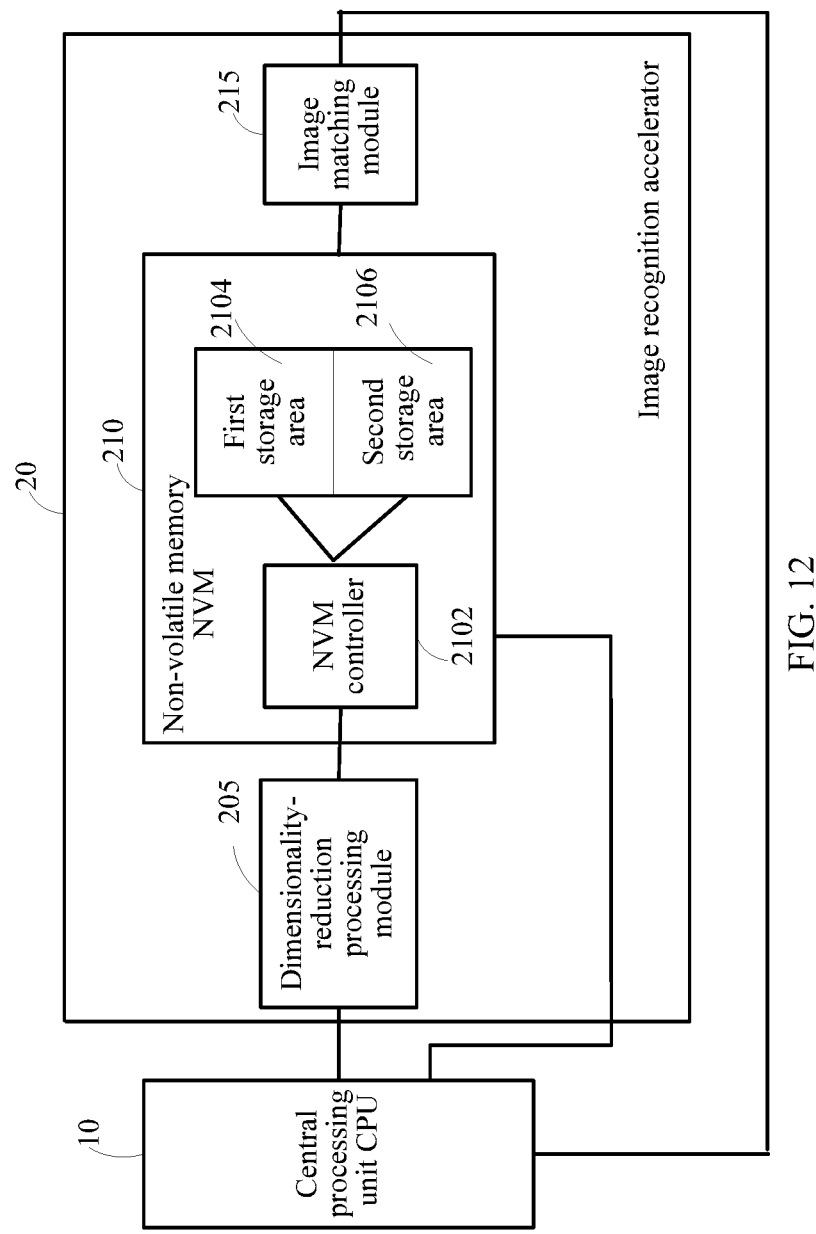
FIG. 12 is a schematic structural diagram of yet another terminal device according to an embodiment of the present invention.

In another case, the function of adjusting the image recognition parameter may alternatively be implemented by the CPU 10 of the terminal device 100. As shown in FIG. 12, FIG. 12 is a schematic structural diagram of yet another terminal device according to an embodiment of the present invention. Based on FIG. 11, there is no parameter adjustment module 220 in FIG. 12, and a function of the parameter adjustment module 220 in FIG. 11 is implemented by the CPU 10 instead. Specifically, in the schematic structural diagram of the terminal device 100 shown in FIG. 12, an image matching module 215 may feed back a matching result to the CPU 10, and the CPU 10 may calculate, according to matching results, an image recognition success rate at which an image recognition accelerator 20 recognizes image data within the preset statistic collection period. The CPU 10 may determine, according to the calculated image recognition success rate and a second image recognition success rate that is set again, whether the image recognition success rate needs to be adjusted. When the CPU 10 determines that an absolute value of a difference between the calculated image recognition success rate and the specified second image recognition success rate is greater than the preset threshold, the CPU 10 may adjust, according to the second image recognition success rate and the system power consumption of the terminal device, a value of at least one of the following parameters: a dimensionality-reduction parameter, a width parameter, or a first current, send an adjusted dimensionality-reduction parameter γ' to a dimensionality-reduction processing module 205, and send an adjusted width parameter ω' and an adjusted first current I' to an NVM 210. In other words, in a structure shown in FIG. 12, the CPU 10 may execute the method of steps 800 to 810 shown in FIG. 8. For specific functions of the components, reference may be made to related descriptions in the foregoing embodiments. Details are not described herein again. It may be understood that, in the structure shown in FIG. 12, when adjusting the image recognition parameter, the CPU 10 may use an instruction form to send the adjusted dimensionality-reduction parameter γ' to the dimensionality-reduction processing module 205 in the image recognition accelerator 20, and send the adjusted width parameter ω' and the adjusted first current I' to the NVM 210 in the image recognition accelerator 20, so as to control the dimensionality-reduction processing module 205 and the NVM 210 to recognize the image data according to the adjusted image recognition parameters.

A person skilled in the art may understand that, in the foregoing embodiment, the example in which an image recognition success rate is adjusted from the first image recognition success rate to the second image recognition success rate is used for describing the process in which the image recognition accelerator implements parameter adjustment according to this embodiment of the present invention. However, the foregoing example is merely an example of a parameter adjustment function that can be implemented by the image recognition accelerator to obtain satisfactory values of the image recognition parameters (including the dimensionality-reduction parameter, the width parameter, and the first current). It may be understood that, in this embodiment of the present invention, the dimensionality-reduction parameter γ, the width parameter ω, and the first current I that are used to recognize the first image data are also obtained by means of adjustment according to the foregoing parameter adjustment manner. In other words, the foregoing parameter adjustment method is a description of a method how parameter values are adjusted to obtain image recognition parameter values that meet requirements for a system power consumption and an image recognition success rate. In an actual application, whenever parameter adjustment is required, parameter values that meet the requirements can be obtained in the foregoing parameter adjustment method.

After obtaining the adjusted dimensionality-reduction parameter γ', the adjusted width parameter ω', and the adjusted first current I', the image recognition accelerator 20 may perform, according to the adjusted dimensionality-reduction parameter γ', the adjusted width parameter ω', and the adjusted first current I', image recognition on the second image data that needs to be recognized subsequently. Specifically, as shown in FIG. 8, in step 815, the dimensionality-reduction processing module 205 may reduce a dimensionality of the second image data according to the adjusted dimensionality-reduction parameter γ'. In step 820, the NVM 210 may store, in the first storage area of the NVM 210 according to the adjusted first current I', ω' low-order bits of each numeric value of the second image data on which dimensionality reduction has been performed, and store, in the second storage area of the NVM 210 according to the second current $I_s$, (N−ω') high-order bits of each numeric value of the second image data on which dimensionality reduction has been performed, where I' is lower than $I_s$. In step 825, the image matching module 215 may determine whether the image library stored in the NVM includes image data matching the second image data on which dimensionality reduction has been performed. Specifically, the image matching module 215 may compare the second image data on which dimensionality reduction has been performed with the image data in the image library stored in the NVM 210, to obtain a matching result of the second image data on which dimensionality reduction has been performed and the image data in the image library stored in the NVM 210. It may be understood that, a process in which the image recognition accelerator performs image recognition on the second image data according to the adjusted dimensionality-reduction parameter γ', the adjusted width parameter ω', and the adjusted first current I' is similar to the foregoing process in which image recognition is performed on the first image data according to the dimensionality-reduction parameter γ, the width parameter ω, and the first current I. For a detailed description, reference may be made to the forgoing description. Details are not described herein again.

It may be understood that, in the parameter adjustment method in this embodiment of the present invention, parameter adjustment is triggered only when a parameter needs to be adjusted. In other words, when a value of an image recognition parameter needs to be adjusted, the image recognition accelerator may trigger stopping of reception of to-be-recognized image data (which may also be referred to as service data), and obtain, in the manner shown in FIG. 9, image recognition parameter values that meet the requirement, by adjusting the parameter value and recognizing the experimental data. After the parameter values that meet the image recognition requirement are obtained, the parameter values that meet the requirement are sent to the dimensionality-reduction processing module 205 and the NVM 210, so that the dimensionality-reduction processing module 205, the NVM 210, and the image matching module 215 can perform image recognition on the to-be-recognized image data (for example, the first image data and the second image data) according to the image recognition parameter values that are obtained by means of adjustment.

Figure 13:
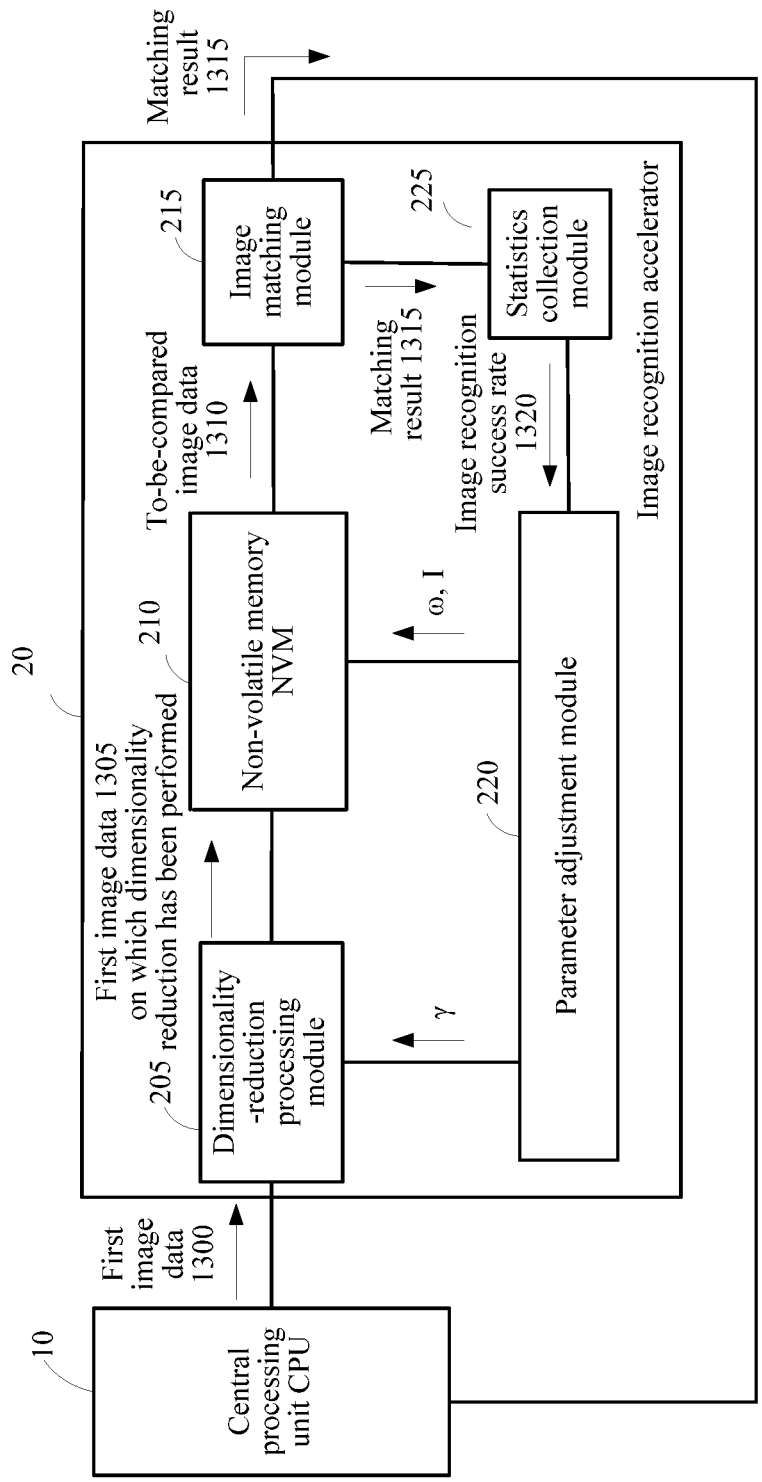
FIG. 13 is a signaling diagram of an image recognition method according to an embodiment of the present invention.

To clearly describe how the image recognition accelerator 20 provided in the embodiments of the present invention recognizes image data, the following provides, with reference to a signaling diagram of an image recognition method, shown in FIG. 13, a simple description for an operating process of the image recognition accelerator 20 shown in FIG. 7. In this embodiment of the present invention, an example in which first image data is recognized is still used for description. As shown in FIG. 13, after a dimensionality-reduction processing module 205 receives to-be-recognized first image data 1300 sent by a CPU 10, the dimensionality-reduction processing module 205 may reduce a dimensionality of the first image data 1300 according to a dimensionality-reduction parameter γ specified by a parameter adjustment module 220. The dimensionality-reduction processing module 205 may reduce the dimensionality of the first image data 1300 by using a Bernoulli matrix, so as to reduce the dimensionality of the first image data 1300 in a sparse-representation-based random mapping manner. After an NVM 210 receives first image data 1305 on which dimensionality reduction has been performed, according to a width parameter ω and a first current I that are specified by the parameter adjustment module 220, the NVM 210 may store, in a first storage area 2104 according to the first current I, ω low-order bits of each numeric value of the first image data on which dimensionality reduction has been performed, and store, in a second storage area 2106 according to the second current $I_s$, (N−ω) high-order bits of each numeric value of the first image data on which dimensionality reduction has been performed. An image matching module 215 may recognize, based on image data in an image library stored in the NVM 210, the first image data 1305 on which dimensionality reduction has been performed, determine whether the image library stored in the NVM includes image data matching the first image data on which dimensionality reduction has been performed, and output a matching result. For ease of illustration, in FIG. 13, the image data in the image library and the first image data 1305 on which dimensionality reduction has been performed are referred to as to-be-compared image data 1310 collectively. On one hand, in FIG. 13, the image matching module 215 may output a recognition result for the first image data 1305 to the CPU 10. On the other hand, a statistics collection module 225 may collect statistics on image matching results of the image matching module 215, to obtain an image recognition success rate 1320 within a statistic period. In this way, the parameter adjustment module 220 may determine, according to the image recognition success rate 1320 obtained by the statistics collection module 225 and the specified second image recognition success rate, whether an image recognition parameter needs to be adjusted. When the parameter adjustment module 220 determines that an image recognition parameter needs to be adjusted, the parameter adjustment module 220 may adjust the image recognition parameter by using the method shown in FIG. 9, output an adjusted dimensionality-reduction parameter γ' to the dimensionality-reduction processing module 205, and output an adjusted width parameter ω' and an adjusted first current I' to the NVM 210. Therefore, the dimensionality-reduction processing module 205, the NVM 210 and the image matching module 215 may recognize subsequent second image data according to the adjusted dimensionality-reduction parameter γ', the adjusted width parameter ω', and the adjusted first current I'.

It may be understood that, FIG. 13 is merely a signaling diagram of a terminal device 100 provided in this embodiment of the present invention. For operating processes of the image recognition accelerator 20 or the terminal device 100 provided in other embodiments, reference may be made to the descriptions in FIG. 13 and the foregoing embodiments. Details are not described herein again.

In the terminal device provided in this embodiment of the present invention, an image recognition accelerator performs image recognition, which reduces a data processing amount of a CPU, and reduces data exchanged between the CPU and a memory. In this way, CPU load can be reduced, limitation by memory bandwidth on application of image data recognition can be relieved, and a speed of recognizing image data can be increased. In addition, in the terminal device provided in this embodiment of the present invention, the image recognition accelerator may reduce a dimensionality of to-be-recognized image data in a sparse-representation-based random mapping manner, and write image data on which dimensionality reduction has been performed, into different storage areas of an NVM in the image recognition accelerator according to different currents. A specified dimensionality-reduction parameter γ, a specified width parameter ω, and a specified first current I are all obtained according to a system power consumption of the terminal device and a specified image recognition success rate of the terminal device; therefore, accuracy of image recognition can be ensured while the system power consumption of the terminal device is reduced.

An embodiment of the present invention further provides a computer program product for data processing, including a computer readable storage medium that stores program code, where an instruction included in the program code is used to execute the method procedure in any one of the foregoing method embodiments. A person of ordinary skill in the art may understand that the foregoing storage medium may include any non-transitory machine-readable medium capable of storing program code, such as a USB flash drive, a removable hard disk, a magnetic disk, an optical disc, a random-access memory (RAM), a solid state disk (SSD), or a non-volatile memory.

It should be noted that, the embodiments of this application are merely exemplary. A person skilled in the art may clearly know that, for convenience and conciseness of description, in the foregoing embodiments, the embodiments have different emphases, and for a part not described in detail in one embodiment, reference may be made to a related description in another embodiment. The embodiments of the present invention, claims, and features disclosed in the accompanying drawings may exist independently, or exist in a combination. Features described in a hardware form in the embodiments of the present invention may be executed by software, and vice versa, which is not limited herein.

What is claimed is:

1. An image recognition accelerator of a terminal device for image recognition, comprising:
   a dimensionality-reduction processing module, configured to:
     receive a dimensionality-reduction parameter γ, and
     perform a dimensionality reduction on a first image data to obtain a reduced first image data according to the received dimensionality-reduction parameter γ, wherein the reduced first image data comprises multiple numeric values, and the dimensionality-reduction parameter γ is obtained according to a system power consumption of the terminal device and a first image recognition success rate of the terminal device;
   a non-volatile memory (NVM), configured to:
     receive a width parameter ω and a first current I, store, in a first storage area of the NVM according to the first current I, ω low-order bits of each numeric value of the reduced first image data, and
     store, in a second storage area of the NVM according to a second current $I_s$, (N−ω) high-order bits of each numeric value of the reduced first image data, wherein each numeric value is represented by N bits, the first current I is lower than the second current $I_s$, and the width parameter ω and the first current I are obtained according to the system power consumption of the terminal device and the first image recognition success rate of the terminal device; and
   an image matching module, configured to determine whether an image library stored in the NVM comprises image data matching the reduced first image data.

2. The image recognition accelerator according to claim 1, further comprising:
   a parameter adjustment module, configured to:
     adjust, according to the first image recognition success rate and the system power consumption of the terminal device, a value of at least one of the following parameters: the dimensionality-reduction parameter, the width parameter, or the first current, wherein the dimensionality-reduction parameter γ, the width parameter ω, and the first current I are obtained based on the adjustment of the value;
     send the dimensionality-reduction parameter γ to the dimensionality-reduction processing module; and
     send the width parameter ω and the first current I to the NVM.

3. The image recognition accelerator according to claim 2, wherein the parameter adjustment module is configured to:
   separately adjust the value of the dimensionality-reduction parameter, the width parameter, or the first current, to obtain multiple adjusted image recognition success rates and multiple adjusted system power consumptions, wherein each adjusted image recognition success rate corresponds to one adjusted system power consumption;
   select a lowest system power consumption from at least one adjusted system power consumption corresponding to at least one adjusted image recognition success rate, wherein an absolute value of a difference between each of the at least one adjusted image recognition success rate and the first image recognition success rate is not greater than a preset threshold; and
   select values of the dimensionality-reduction parameter γ, the width parameter ω, and the first current I according to a highest image recognition success rate with the lowest system power consumption;
   send the dimensionality-reduction parameter γ to the dimensionality-reduction processing module; and
   send the width parameter ω and the first current I to the NVM.

4. The image recognition accelerator according to claim 1, wherein
   the parameter adjustment module is further configured to:
     if an absolute value of a difference between a calculated image recognition success rate and a second image recognition success rate is greater than a preset threshold, adjust, according to the second image recognition success rate and the system power consumption of the terminal device, a value of at least one of the following parameters: the dimensionality-reduction parameter, the width parameter, or the first current, to obtain an adjusted dimensionality-reduction parameter γ', an adjusted width parameter ω', and an adjusted first current I', wherein the second image recognition success rate is different from the first image recognition success rate;

the dimensionality-reduction processing module is further configured to perform the dimensionality reduction on a second image data to obtain a reduced second image data according to the adjusted dimensionality-reduction parameter γ';

the non-volatile memory NVM is further configured to: store, in the first storage area of the NVM according to the adjusted first current I', ω' low-order bits of each numeric value of the reduced second image data, and store, in the second storage area of the NVM according to the second current $I_s$, (N−ω') high-order bits of each numeric value of the reduced second image data, wherein I' is lower than $I_s$; and the image matching module is further configured to determine whether the image library stored in the NVM comprises image data matching the reduced second image data.

5. The image recognition accelerator according to claim 4, further comprising:

a statistics collection module, configured to collect statistics on output of the image matching module within a collection period, wherein the calculated image recognition success rate is based on the collected statistics.

6. The image recognition accelerator according to claim 4, wherein the parameter adjustment module is configured to:

if an absolute value of a difference between a calculated image recognition success rate and the second image recognition success rate is greater than the preset threshold, separately adjust the value of the dimensionality-reduction parameter, the width parameter, or the first current, to obtain multiple adjusted image recognition success rates and multiple adjusted system power consumptions E, wherein a value of E is proportional to a value of $\gamma((N-\omega)*I_s^2+\omega*I)$, and each adjusted image recognition success rate corresponds to one adjusted system power consumption;

select a lowest system power consumption E' from at least one adjusted system power consumption corresponding to at least one adjusted image recognition success rate, wherein an absolute value of a difference between each of the at least one adjusted image recognition success rate and the second image recognition success rate is not greater than the preset threshold; and select values of the adjusted dimensionality-reduction parameter γ', the adjusted width parameter ω', and the adjusted first current I' according to a highest image recognition success rate with the lowest power consumption E';

send the adjusted dimensionality-reduction parameter γ' to the dimensionality-reduction processing module; and send the adjusted width parameter ω' and the adjusted first current I' to the NVM.

7. The image recognition accelerator according to claim 1, wherein the dimensionality reduction is performed according to the first image data and a binary matrix, wherein the first image data includes a matrix with k rows and m columns, the binary matrix includes a matrix with m rows and n columns, and the reduced first image data includes a matrix with k rows and n columns, wherein k, m, and n are positive integers, a value of m is greater than a value of n, the value of n is determined according to the dimensionality-reduction parameter γ, and γ=n/m.

8. The image recognition accelerator according to claim 7, wherein the binary matrix comprises a Bernoulli mapping matrix.

9. A terminal device, comprising a central processing unit (CPU) and an image recognition accelerator, wherein the CPU is configured to send to-be-recognized first image data to the image recognition accelerator; and the image recognition accelerator is configured to: perform a dimensionality reduction on the first image data to obtain a reduced first image data according to a dimensionality-reduction parameter γ, wherein the reduced first image data comprises multiple numeric values, and the dimensionality-reduction parameter γ is obtained according to a system power consumption of the terminal device and a first image recognition success rate of the terminal device;

store, in a first storage area of an NVM according to a first current I, ω low-order bits of each numeric value of the reduced first image data, and store, in a second storage area of the NVM according to a second current $I_s$, (N−ω) high-order bits of each numeric value of the reduced first image data, wherein each numeric value is represented by N bits, ω is a width parameter, I is lower than $I_s$, and the width parameter ω and the first current I are obtained according to the system power consumption of the terminal device and the first image recognition success rate of the terminal device; and determine whether an image library stored in the NVM comprises image data matching the reduced first image data.

10. The terminal device according to claim 9, wherein the image recognition accelerator is further configured to:

adjust, according to the first image recognition success rate and the system power consumption of the terminal device, a value of at least one of the following parameters: the dimensionality-reduction parameter, the width parameter, or the first current, wherein the dimensionality-reduction parameter γ, the width parameter ω, and the first current I are obtained based on the adjustment of the value.

11. The terminal device according to claim 10, wherein the image recognition accelerator is specifically configured to:

separately adjust the value of the dimensionality-reduction parameter, the width parameter, or the first current, to obtain multiple adjusted image recognition success rates and multiple adjusted system power consumptions, wherein each adjusted image recognition success rate corresponds to one adjusted system power consumption;

select a lowest system power consumption from at least one adjusted system power consumption corresponding to at least one adjusted image recognition success rate, wherein an absolute value of a difference between each of the at least one adjusted image recognition success rate and the first image recognition success rate is not greater than a preset threshold; and select values of the dimensionality-reduction parameter γ, the width parameter ω, and the first current I according to a highest image recognition success rate with the lowest system power consumption.

12. The terminal device according to claim 9, wherein the image recognition accelerator is further configure to:
if an absolute value of a difference between a calculated image recognition success rate and a second image recognition success rate is greater than a preset threshold, adjust, according to the second image recognition success rate and the system power consumption of the terminal device, at least one of the following parameters: the dimensionality-reduction parameter, the width parameter, or the first current, to obtain an adjusted dimensionality-reduction parameter γ', an adjusted width parameter ω', and an adjusted first current I', wherein the second image recognition success rate is different from the first image recognition success rate;
the CPU is further configured to send second image data to the image recognition accelerator; and
the image recognition accelerator is further configured to:
perform the dimensionality reduction on the second image data to obtain a reduced second image data according to the adjusted dimensionality-reduction parameter γ';
store, in the first storage area of the NVM according to the adjusted first current I', ω' low-order bits of each numeric value of the reduced second image data, and store, in the second storage area of the NVM according to the second current $I_s$, (N−ω') high-order bits of each numeric value of the reduced second image data, wherein I' is lower than $I_s$; and
determine whether the image library stored in the NVM comprises image data matching the reduced second image data.

13. The terminal device according to claim 12, wherein the image recognition accelerator is configured to:
separately adjust the value of the dimensionality-reduction parameter, the width parameter, or the first current, to obtain multiple adjusted image recognition success rates and multiple adjusted system power consumptions E, wherein a value of E is proportional to a value of $\gamma((N-\omega)*I_s^2+\omega*I)$, and each adjusted image recognition success rate corresponds to one adjusted system power consumption;
select a lowest system power consumption E' from at least one adjusted system power consumption corresponding to at least one adjusted image recognition success rate, wherein an absolute value of a difference between each of the at least one adjusted image recognition success rate and the second image recognition success rate is not greater than the preset threshold; and
select values of the adjusted dimensionality-reduction parameter γ', the adjusted width parameter ω', and the adjusted first current I' according to a highest image recognition success rate with the lowest power consumption E'.

14. The terminal device according to claim 9, wherein
the CPU is further configured to: collect statistics on output by of the image recognition accelerator within a preset statistic collection period, wherein a calculated image recognition success rate is based on the collected statistics; and
determine that an absolute value of a difference between the calculated image recognition success rate and a specified second image recognition success rate is greater than a preset threshold;
the image recognition accelerator is further configured to adjust, according to the second image recognition success rate and the system power consumption of the terminal device, a value of at least one of the following parameters: the dimensionality-reduction parameter, the width parameter, or the first current, to obtain an adjusted dimensionality-reduction parameter γ', an adjusted width parameter ω', and an adjusted first current I', wherein the second image recognition success rate is different from the first image recognition success rate;
the CPU is further configured to send second image data to the image recognition accelerator; and
the image recognition accelerator is further configured to:
perform the dimensionality reduction on the second image data according to the adjusted dimensionality-reduction parameter γ';
store, in the first storage area of the NVM according to the adjusted first current I', ω' low-order bits of each numeric value of the reduced second image data, and store, in the second storage area of the NVM according to the second current $I_s$, (N−ω') high-order bits of each numeric value of the reduced second image data, wherein I' is lower than $I_s$; and
determine whether the image library stored in the NVM comprises image data matching the reduced second image data.

15. The terminal device according to claim 9, wherein the CPU is further configured to:
collect statistics on output of the image recognition accelerator within a preset statistic collection period, wherein a calculated image recognition success rate is based on the collected statistics;
if an absolute value of a difference between the calculated image recognition success rate and a second image recognition success rate is greater than a preset threshold, adjust, according to the second image recognition success rate and the system power consumption of the terminal device, a value of the at least one of the following parameters: the dimensionality-reduction parameter, the width parameter, or the first current, to obtain an adjusted dimensionality-reduction parameter γ', an adjusted width parameter ω', or an adjusted first current I', wherein the second image recognition success rate is different from the first image recognition success rate; and
send second image data to the image recognition accelerator; and
the image recognition accelerator is further configured to:
perform the dimensionality reduction on the second image data according to the adjusted dimensionality-reduction parameter γ';
store, in the first storage area of the NVM according to the adjusted first current I', ω' low-order bits of each numeric value of the reduced second image data, and store, in the second storage area of the NVM according to the second current $I_s$, (N−ω') high-order bits of each numeric value of the reduced second image data, wherein I' is lower than $I_s$; and
determine whether the image library stored in the NVM comprises image data matching the reduced second image data.

16. The terminal device according to claim 15, wherein the CPU is specifically configured to:
separately adjust a value of the dimensionality-reduction parameter, the width parameter, or the first current, to obtain multiple adjusted image recognition success rates and multiple adjusted system power consumptions E, wherein a value of E is proportional to a value of $\gamma((N-\omega)*I_s^2+\omega*I)$, and each adjusted image recognition success rate corresponds to one adjusted system power consumption;

select a lowest system power consumption E' from at least one adjusted system power consumption corresponding to at least one adjusted image recognition success rate, wherein an absolute value of a difference between each of the at least one adjusted image recognition success rate and the second image recognition success rate is not greater than the preset threshold; and select values of the adjusted dimensionality-reduction parameter γ', the adjusted width parameter ω', and the adjusted first current I' according to a highest image recognition success rate with the lowest power consumption E'.

17. The terminal device according to claim 9, wherein the dimensionality reduction is performed according to the first image data and a binary matrix, wherein the first image data includes a matrix with k rows and m columns, the binary matrix includes a matrix with m rows and n columns, and the reduced first image data includes a matrix with k rows and n columns, wherein k, m, and n are positive integers, a value of m is greater than a value of n, the value of n is determined according to the dimensionality-reduction parameter γ, and γ=n/m.

18. The terminal device according to claim 17, wherein the binary matrix comprises a Bernoulli mapping matrix.

19. An image recognition method performed by an image recognition accelerator in a terminal device, wherein the method comprises:

performing a dimensionality reduction on a first image data to obtain a reduced first image data according to a dimensionality-reduction parameter γ, wherein the reduced first image data on comprises multiple numeric values, and the dimensionality-reduction parameter γ is obtained according to a system power consumption of the terminal device and a first image recognition success rate of the terminal device;

storing, in a first storage area of a non-volatile memory (NVM) in the image recognition accelerator according to a first current I, ω low-order bits of each numeric value of the reduced first image data; and storing, in a second storage area of the NVM according to a second current $I_s$, (N−ω) high-order bits of each numeric value of the reduced first image data, wherein each numeric value is represented by N bits, ω is a width parameter, I is lower than $I_s$, and the width parameter ω and the first current I are obtained according to the system power consumption of the terminal device and the first image recognition success rate of the terminal device; and determining whether an image library stored in the NVM comprises image data matching the reduced first image data.

20. The image recognition method according to claim 19, further comprising:

adjusting, according to the first image recognition success rate and the system power consumption of the terminal device, a value of at least one of the following parameters: the dimensionality-reduction parameter, the width parameter, or the first current, wherein the dimensionality-reduction parameter γ, the width parameter ω, and the first current I are obtained based on the adjustment of the value.

21. The image recognition method according to claim 20, wherein the adjusting comprises:

separately adjusting the value of the dimensionality-reduction parameter, the width parameter, or the first current, to obtain multiple adjusted image recognition success rates and multiple adjusted system power consumptions, wherein each adjusted image recognition success rate corresponds to one adjusted system power consumption;

selecting a lowest system power consumption from at least one adjusted system power consumption corresponding to at least one adjusted image recognition success rate, wherein an absolute value of a difference between each of the at least one adjusted image recognition success rate and the first image recognition success rate is not greater than a preset threshold; and selecting values of the dimensionality-reduction parameter γ, the width parameter ω, and the first current I according to a highest image recognition success rate with the lowest system power consumption.

22. The image recognition method according to claim 19, further comprising:

determining that an absolute value of a difference between a calculated image recognition success rate and a second image recognition success rate is greater than a preset threshold;

adjusting, according to the second image recognition success rate and the system power consumption of the terminal device, a value of at least one of the following parameters: the dimensionality-reduction parameter, the width parameter, or the first current, to obtain an adjusted dimensionality-reduction parameter γ', an adjusted width parameter ω', and an adjusted first current I', wherein the second image recognition success rate is different from the first image recognition success rate;

performing the dimensionality reduction on a second image data to obtain a reduced second image data according to the adjusted dimensionality-reduction parameter γ';

storing, in the first storage area of the NVM according to the adjusted first current I', ω' low-order bits of each numeric value of the reduced second image data, and storing, in the second storage area of the NVM according to the second current $I_s$, (N−ω') high-order bits of each numeric value of the reduced second image data, wherein I' is lower than $I_s$; and determining whether the image library stored in the NVM comprises image data matching the reduced second image data on.

23. The image recognition method according to claim 22, further comprising:

collecting statistics on output of the image recognition accelerator within a collection period, wherein the calculated image recognition success rate is based on the collected statistics.

24. The image recognition method according to claim 19, wherein the dimensionality reduction is performed according to the first image data and a binary matrix, wherein the first image data includes a matrix with k rows and m columns, the binary matrix includes a matrix with m rows and n columns, and the reduced first image data includes a matrix with k rows and n columns, wherein k, m, and n are positive integers, a value of m is greater than a value of n, the value of n is determined according to the dimensionality-reduction parameter γ, and γ=n/m.

25. The image recognition method according to claim 22, wherein the adjusting, according to the second image recognition success rate and the system power consumption of the terminal device, at least one of the following parameters: the dimensionality-reduction parameter, the width parameter, or the first current comprises:

separately adjusting the value of the dimensionality-reduction parameter, the width parameter, or the first current, to obtain multiple adjusted image recognition success rates and multiple adjusted system power consumptions E, wherein a value of E is proportional to a value of $\gamma((N-\omega)*I_s^2+\omega*I)$;

selecting a lowest system power consumption E' from at least one adjusted system power consumption corresponding to at least one adjusted image recognition success rate, wherein an absolute value of a difference between each of the at least one adjusted image recognition success rate and the second image recognition success rate is not greater than the preset threshold; and selecting values of the adjusted dimensionality-reduction parameter $\gamma'$, the adjusted width parameter $\omega'$, and the adjusted first current I' according to a highest image recognition success rate with the lowest power consumption E'.

26. The image recognition method according to claim 24, wherein the binary matrix comprises a Bernoulli mapping matrix.

\* \* \* \* \*